(12) United States Patent
Beckert et al.

(10) Patent No.: US 12,111,874 B1
(45) Date of Patent: Oct. 8, 2024

(54) EXPLORATORY DATA ANALYSIS SYSTEM FOR AUTOMATED GENERATION OF SEARCH QUERIES USING MACHINE LEARNING TECHNIQUES TO IDENTIFY CERTAIN LOG FIELDS AND CORRELATION THEREOF

(71) Applicant: SPLUNK Inc., San Francisco, CA (US)

(72) Inventors: Francis Beckert, Mountain View, CA (US); Kristal Curtis, San Francisco, CA (US); Om Rajyaguru, Durham, NC (US); Abraham Starosta, Boston, MA (US); Poonam Yadav, San Francisco, CA (US)

(73) Assignee: Splunk Inc., San Francisco, CA (US)

( * ) Notice: Subject to any disclaimer, the term of this patent is extended or adjusted under 35 U.S.C. 154(b) by 0 days.

(21) Appl. No.: 18/147,641

(22) Filed: Dec. 28, 2022

(51) Int. Cl.
*G06F 16/9535* (2019.01)
*G06F 16/2457* (2019.01)
*G06F 16/248* (2019.01)

(52) U.S. Cl.
CPC .... *G06F 16/9535* (2019.01); *G06F 16/24578* (2019.01); *G06F 16/248* (2019.01)

(58) Field of Classification Search
USPC ...................................................... 707/723
See application file for complete search history.

(56) References Cited

U.S. PATENT DOCUMENTS

| | | | |
|---|---|---|---|
| 7,937,344 B2 | 5/2011 | Baum et al. | |
| 8,112,425 B2 | 2/2012 | Baum et al. | |
| 8,751,529 B2 | 6/2014 | Zhang et al. | |
| 8,788,525 B2 | 7/2014 | Neels et al. | |
| 9,146,984 B1 * | 9/2015 | Bozkaya | G06F 16/3332 |
| 9,215,240 B2 | 12/2015 | Merza et al. | |
| 9,286,413 B1 | 3/2016 | Coates et al. | |
| 10,127,258 B2 | 11/2018 | Lamas et al. | |

(Continued)

OTHER PUBLICATIONS

Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

(Continued)

*Primary Examiner* — Cam Linh T Nguyen
(74) *Attorney, Agent, or Firm* — Rutan & Tucker LLP

(57) ABSTRACT

Implementations of this disclosure provide a search assistant engine that integrates with a data intake and query system and provides an intuitive user interface to assist a user in searching and evaluating indexed event data. Additionally, the search assistant engine provides logic to intelligently provide data to the user through the user interface such as determining fields of events likely to be of interest based on determining a mutual information score for each field and determining groups of related fields based on determining a mutual information score for each field grouping. Some implementations utilize machine learning techniques in certain analyses such as when clustering events and determining an event templates for each cluster. Additionally, the search assistant engine may import terms or characters from user interaction into predetermined search query templates to generate tailored search query for the user.

20 Claims, 19 Drawing Sheets

(56) References Cited

U.S. PATENT DOCUMENTS

| | | | | |
|---|---|---|---|---|
| 11,423,252 | B1* | 8/2022 | Jagannathan | G06V 20/41 |
| 2015/0046423 | A1* | 2/2015 | Weeks | G06F 16/951 |
| | | | | 707/708 |
| 2019/0098106 | A1 | 3/2019 | Mungel et al. | |
| 2023/0169071 | A1* | 6/2023 | Nalala Pochaiah | |
| | | | | G06F 16/24575 |
| | | | | 707/767 |

OTHER PUBLICATIONS

Carraso, David, "Exploring Splunk," published by CITO Research, New York, NY, Apr. 2012.

F. Beckert et al. "Exploratory Data Analysis System For Generation Of Wildcards Within Log Templates Through Log Clustering And Analysis Thereof," filed Dec. 28, 2022, U.S. Appl. No. 18/147,639 including its prosecution history**.

Splunk Cloud 8.0.2004 User Manual, available online, retrieved May 20, 2020 from docs.splunk.com.

Splunk Enterprise 8.0.0 Overview, available online, retrieved May 20, 2020 from docs.splunk.com.

Splunk Quick Reference Guide, updated 2019, available online at https://www.splunk.com/pdfs/solution-guides/splunk-quick-reference-guide.pdf, retrieved May 20, 2020.

* cited by examiner

Event Types

We found 15 different event types across your 10000 events. Below are examples of events that match the event types we found. You'll find that 2596 of your events follow the format present in the first row of the table. Select an event type from the table below to filter your view of the rest of the app to only the fields present in the event type you selected.

| cluster_count ⇕ | _raw ⇕ |
|---|---|
| 2596 | Aug 20 15:17:59 : [message_id]: [direction] TCP connection [company_ASA_vendor_action] from [src_ip]/[src_port] to [dest_ip]/[dest_port] |
| 2199 | Aug 20 15:12:37 : %[app]-6-[message_id]: Teardown [transport] connection [session_id] for [src_interface]:[src_ip]/[src_port] to [dest_interface]:[dest_ip]/[dest_port] |
| 2068 | Aug 20 15:17:59 : %ASA-6-[message_id]: [company_ASA_vendor_action] [direction] [transport] connection [session_id] for [dest_interface]:[src_ip]/[dest_port] |
| 2016 | Aug 20 15:18:00 : %ASA-6-[message_id]: Teardown dynamic [transport] translation from [src_interface]:[src_port] to [dest_interface]:[dest_ip]/[dest_port] |
| 1019 | Aug 20 15:18:00 : %ASA-4-106023: Deny [transport] src inside: [src_ip]/[src_port] dst outside: [dest_ip]/[dest_port] by access-group "inside_access_in" [0x0, 0x0] |

*FIG. 12*

Related Fields

Groups of related fields are ranked by how much information they contain. Click on a field group to explore rare value combos within the group.

| field_information ⬌ | field_group ⬌ |
|---|---|
| 2. 6113379000009084 | action duration_hour message_id dest_ip dest direction compant_ASA_action durattion_minute |
| 2. 5057582876423456 | src_ip src |
| 2. 0387545898085806 | duration_second duration |
| 1. 5715367937482647 | vendor_definition vendor_class |
| 1. 5362041357414014 | src_unterface src_zone |

<Prev [1] 2 Next >

Compare values across field groups.

| count ⬌ | vendor_definition ⬌ | vendor_class ⬌ |
|---|---|---|
| 3616 | Access Lists | acl |
| 3616 | Access Lists | session |
| 2015 | NAT and PAT | session |
| 2015 | NAT and PAT | xlate |
| 27 | NP SSL | npssl |

<Prev [1] 2 3 Next >

Currently you are comparing values across the fields vendor_definition vendor_class. Select any group of fields from the dropdown or use the drilldown on the left to select a field group.

The group of fields action duration_hour message_id dest_ip dest laction vendor_action direction duration_minute seems to be important. You can compare value across this group in the table below, or select any combination of similar fields from this using the dropdown.

*FIG. 14*

Click on one of the suggested searches to dive deep into your data

| Category | Description | Search | Actions |
|---|---|---|---|
| Event Types | Explore rare event types | index = botsv3 \| search sourcetype=Company:asa \| search \| table * \| sort_time \| cluster t=0.65 | Add to Search |
| Event Types | Explore logs matching the selected event type | index = botsv3 \| search sourcetype=Company:asa \| search \| table * \| sort_time \| cluster t=0.65 | Add to Search |
| Rare Values | Explore events with rare dest_port values | index = botsv3 \| search sourcetype=Company:asa \| search \| table * \| sort_time \| eventstats count by dest_port | Add to Search |
| Rare Values | Explore events with rare combinations of vendor_definition vendor_class | index = botsv3 \| search sourcetype=Company:asa \| search \| table * \| sort_time \| eventstats count by vendor_definition vendor_class \| table_raw vendor_definition vendor_class | Add to Search |
| Anomaly Detection | Look for data ingest volume anomalies | index = botsv3 \| search sourcetype=Company:asa \| search \| table * \| sort_time \| cluster t=0.65 match=termset showcount=t \| fit ads count | Add to Search |
| Anomaly Detection | Use the anomaly detection assistant to find anomalies in dest_port | index = botsv3 \| search sourcetype=Company:asa \| search \| table dest_port \| sort_time \| fits ads dest_port | Add to Search |
| Data Hygiene | Cleanse your data of duplicated and empty fields | index = botsv3 \| search sourcetype=Company:asa \| search \| table_time_raw_cd_bkt_indextime date_hour date_minute punct log_level message_id app comunication_protocal dest duration laction protocol signature signature_id src protocol_version description severity_level vendor_definition vendor_class \| sort_time | Add to Search |
| Field Inspection | Learn more about your fields | index = botsv3 \| search sourcetype=Company:asa \| search \| fieldsummary \| table field count distinct_count is _exact max mean min numeric_count stdev proportion_missing_values | Add to Search |

FIG. 15

EXPLORATORY DATA ANALYSIS SYSTEM FOR AUTOMATED GENERATION OF SEARCH QUERIES USING MACHINE LEARNING TECHNIQUES TO IDENTIFY CERTAIN LOG FIELDS AND CORRELATION THEREOF

RELATED APPLICATIONS

Any and all applications for which a foreign or domestic priority claim is identified in the Application Data Sheet as filed with the present application are incorporated by reference under 37 CFR 1.57 and made a part of this specification.

BACKGROUND

Computer system management and data analysis have many challenges. Many computers on a network generate massive amounts of data in log files, telemetry files, reports, etc. The sheer quantity of data can easily overwhelm a human operator, and automation is needed to make the load more manageable. The same is true of searchable data stores that may contain massive quantities of data that need to be searched and evaluated. However, there is a need to simplify the search and evaluation process through provision of an intuitive user interface that provides display portions that suggest the user evaluate and search the data in certain ways (e.g., to determine rare values for a particular field). Currently, without an intuitive user interface and logic that intelligently guides users through the search and evaluation process, users lacking expert knowledge on search and evaluation methodologies and/or required search languages may be unable to successfully perform the necessary search and evaluation.

BRIEF DESCRIPTION OF THE DRAWINGS

Illustrative examples are described in detail below with reference to the following figures:

FIG. 12 is an example user interface portion corresponding to the event type templates display section of FIG. 9, according to implementations of the present disclosure.

FIG. 14 is an example user interface portion corresponding to the related fields display section of FIG. 9, according to implementations of the present disclosure.

FIG. 15 is an example user interface portion corresponding to the generated search queries display section of FIG. 9, according to implementations of the present disclosure.

DETAILED DESCRIPTION

Figure 1:
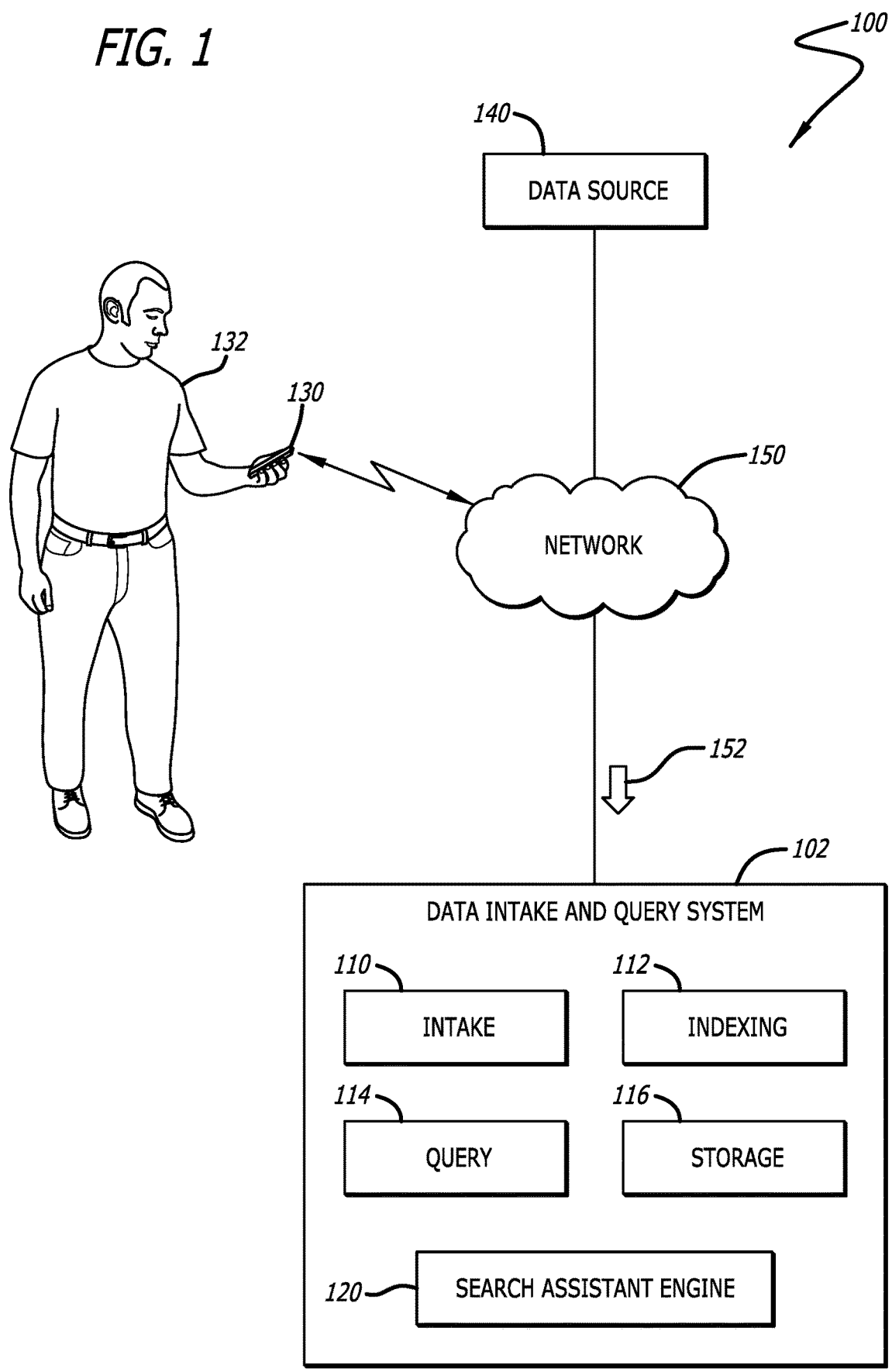
FIG. 1 is a block diagram of an illustrative data processing environment in accordance with various implementations of the present disclosure.

Computer system management and data analysis have many challenges. Many computers on a network generate massive amounts of data in log files, telemetry files, reports, etc. The sheer quantity of data can easily overwhelm a human operator, and automation is needed to make the load more manageable. The same is true of searchable data stores that may contain massive quantities of data that need to be searched and evaluated.

Although expert network administrators seasoned in database relations and querying may very well have expertise in database languages, such not often the case with all employees of an enterprise that are tasked with searching a repository of data to detect anomalies, determine patterns, or otherwise search of particular events stored therein. For example, an enterprise employee, such as a software engineer, may be tasked with searching a repository of events but the software engineer does not have expertise knowledge in a particular database language required or other proprietary search language, such as a pipelined command language, which may be, for example, SPLUNK® Search Processing Language (SPL). As discussed below, an event is a discrete portion of machine data that can be associated with a timestamp.

Currently, there is a need for a search assistant engine that assists a user in searching certain data repositories, such as those that store indexed events. It would be advantageous for the search assistant engine is to provide a user-friendly graphical interface configured to receive user input and populate or update various display portions in light of the user input. Further, the various display portions should provide insight and intuitive information to the user that continues to be tailored as the user interacts with the user interface. Further, it would also be advantageous to users if the search assistant engine provided generalized information about certain events (e.g., templates of similar events) and/or search query templates that are tailored based on user interaction with the user interface and configured to perform certain tasks upon execution such as anomaly detection.

As discussed above, search and evaluation of a data repository storing large amounts of machine data, e.g., hundreds of thousands or even millions of event, poses an enormous challenge for a novice network administrator or other individual that is not expertly-versed in search and evaluation techniques and the necessary programming language(s). The disclosure details a search assistant engine that is configured to provide a front-end user-interface to a user that intuitively guides the user in searching and evaluating event data. Additionally, the search assistant engine is configured with logic that performs back-end processing such as search query execution (e.g., utilizing a pipelined command language such as SPLUNK® SPL) and analyses including machine-learning based clustering of event data, automated template generation through detection of wildcards, and automated generation of search query templates that are uniquely tailored through interaction with the user interface.

FIG. 1 is a block diagram of an illustrative data processing environment in accordance with various implementations of the present disclosure. Generally, the data processing environment 100 refers to an environment that provides for, or enables, the management, storage, and retrieval of data. The data processing environment 100 includes a data intake and query system 102 is shown to comprise an intake system 110, an indexing system 112, a query system 114, and a storage system 116. Also present in the data intake and query system 102 may a search assistant engine 120. In some embodiments, the search assistant engine 120 may be present elsewhere in the data intake and query system 102 like, for example, internal to the query system 114.

As will be discussed in further detail below, the search assistant engine 120 is configured to provide functionality for the data intake and query system 102 pertaining exploration of data and events within a user-selected index, which may result in the generation of event type templates and/or the generation of search query statements based on prior user interaction with a user interface provided by the search assistant engine 120. At a high level, the search assistant engine 120 is configured to provide a user interface with numerous portions that may individually provide particularized information to a user through execution of a search query statement followed by filtering and/or analyses of the query results. As shown in FIGS. 9-15, an illustrative user interface provides several interaction points configured to receive user input pertaining to a selected index, a selected source or source type, and/or a search string to be used as a filter. Further, the interaction points may include representations of analysis results such as, for example, graphical representations of "interesting" fields defined and ranked according to a mutual information computation and ranked (or scored) listing of groups of fields within event of the selected index, wherein the ranking/scoring is a result of a mutual information computation.

Specifically, the search assistant engine 120—including its provided user interface and logic—provides a guided visual that assists users utilizing the storage and query functionality of the data intake and query system 102 and, generally, the components of the environment 100. The search assistant engine 120 is configured to execution certain queries, perform certain analyses, and provide the results of such in certain visuals intended to assist the user in exploring the data of the selected index. As should be understood, a novice user presented with the task of detecting anomalies or extracting patterns within events stored within an index, which may be tens of thousands of events, is a daunting task. Thus, the user interface and logic of the search assistant engine 120 assists a user in reviewing these events through certain analyses and visuals (e.g., determining event type templates, or fields or field groups having a high level of mutual information).

In some embodiments, the environment 100 includes the data intake and query system 102 communicatively coupled to one or more client devices 130 and one or more data sources 140 via a communications network 150. The network 150 may include an element or system that facilitates communication between the entities of the environment 100. The network 150 may include an electronic communications network, such as the Internet, a local area network (LAN), a wide area network (WAN), a wireless local area network (WLAN), a cellular communications network, and/or the like. In some embodiments, the network 150 can include a wired or a wireless network. In some embodiments, the network 150 can include a single network or a combination of networks.

As discussed in greater detail below, the indexing system 112 obtains machine date from a data source such as the data source 140 then processes and stores the data. Processing and storing of data may be referred to as "ingestion" of the data. Processing of the data can include parsing the data to identify individual events, where an event is a discrete portion of machine data that can be associated with a timestamp. Processing of the data can further include generating an index of the events, where the index is a data storage structure in which the events are stored.

The data source 140 may be a source of incoming source data 152 being fed into the data intake and query system 102. A data source 140 can be or include one or more external data sources, such as web servers, application servers, databases, firewalls, routers, operating systems, and software applications that execute on computer systems, mobile devices, sensors, and/or the like. Data source 140 may be located remote from the data intake and query system 102. For example, a data source 140 may be defined on an agent computer operating remote from the data intake and query system 102, such as on-site at a customer's location, that transmits source data 152 to data intake and query system 102 via a communications network (e.g., network 150).

Source data 152 can be a stream or set of data fed to an entity of the data intake and query system 102, such as a forwarder (not shown) or the indexing system 112. In some embodiments, the source data 152 can be heterogeneous machine-generated data received from various data sources 140, such as servers, databases, applications, networks, and/or the like. Source data 152 may include, for example raw data (e.g., raw time-series data), such as server log files, activity log files, configuration files, messages, network packet data, performance measurements, sensor measurements, and/or the like. For example, source data 152 may include log data generated by a server during the normal course of operation (e.g., server log data). In some embodiments, the source data 152 may be minimally processed to generate minimally processed source data. For example, the source data 152 may be received from a data source 140, such as a server. The source data 152 may then be subjected to a small amount of processing to break the data into events. As discussed, an event generally refers to a portion, or a segment of the data, that is associated with a time. The resulting events may be indexed (e.g., stored in a raw data file associated with an index file). In some embodiments, indexing the source data 152 may include additional processing, such as compression, replication, and/or the like.

As can be appreciated, source data 152 might be structured data or unstructured data. Structured data has a predefined format, wherein specific data items with specific data formats reside at predefined locations in the data. For example, data contained in relational databases and spreadsheets may be structured data sets. In contrast, unstructured data does not have a predefined format. This means that unstructured data can comprise various data items having different data types that can reside at different locations.

The storage 116 may include a medium for the storage of data thereon. For example, storage 116 may include non-transitory computer-readable medium storing data thereon that is accessible by entities of the environment 100, such as the search assistant engine 120. As can be appreciated, the storage 116 may store the data (e.g., events) in any manner. In some implementations, the data may include one or more indexes including one or more buckets, and the buckets may include an index file and/or raw data file (e.g., including parsed, time-stamped events). In some embodiments, each data store is managed by a given indexer that stores data to the data store and/or performs searches of the data stored on the data store. Although certain embodiments are described with regard to a single storage 116 for purposes of illustration, embodiments may include employing multiple storages 116, such as a plurality of distributed data stores 1914.

As described, events within the storage 116 may be represented by a data structure that is associated with a certain point in time and includes a portion of raw machine data (e.g., a portion of machine-generated data that has not been manipulated). An event may include, for example, a line of data that includes a time reference (e.g., a timestamp), and one or more other values. In the context of server log data, for example, an event may correspond to a log entry for a client request and include the following values: (a) a time value (e.g., including a value for the data and time of the request, such as a timestamp), and (b) a series of other values including, for example, a page value (e.g., including a value representing the page requested), an IP (Internet Protocol) value (e.g., including a value for representing the client IP address associated with the request), and an HTTP (Hypertext Transfer protocol) code value (e.g., including a value representative of an HTTP status code), and/or the like. That is, each event may be associated with one or more values. Some events may be associated with default values, such as a host value, a source value, a source type value and/or a time value. A default value may be common to some of all events of a set of source data.

In some embodiments, an event can be associated with one or more characteristics that are not represented by the data initially contained in the raw data, such as characteristics of the host, the source, and/or the source type associated with the event. In the context of server log data, for example, if an event corresponds to a log entry received from Server A, the host and the source of the event may be identified as Server A, and the source type may be determined to be "server." In some embodiments, values representative of the characteristics may be added to (or otherwise associated with) the event. In the context of server log data, for example, if an event is received from Server A, a host value (e.g., including a value representative of Server A), a source value (e.g., including a value representative of Server A), and a source type value (e.g., including a value representative of a "server") may be appended to (or otherwise associated with) the corresponding event.

In some embodiments, events can correspond to data that is generated on a regular basis and/or in response to the occurrence of a given event. In the context of server log data, for example, a server that logs activity every second may generate a log entry every second, and the log entries may be stored as corresponding events of the source data. Similarly, a server that logs data upon the occurrence of an error event may generate a log entry each time an error occurs, and the log entries may be stored as corresponding events of the source data.

The client device 130 may be used or otherwise accessed by a user 132, such as a system administrator or a customer. A client device 130 may include any variety of electronic devices. In some embodiments, a client device 130 can include a device capable of communicating information via the network 150. A client device 130 may include one or more computer devices, such as a desktop computer, a server, a laptop computer, a tablet computer, a wearable computer device, a personal digital assistant (PDA), a smart phone, and/or the like. In some embodiments, a client device 130 may be a client of the event processing system 1902. In some embodiments, a client device 130 can include various input/output (I/O) interfaces, such as a display (e.g., for displaying a graphical user interface (GUI), an audible output user interface (e.g., a speaker), an audible input user interface (e.g., a microphone), an image acquisition interface (e.g., a camera), a keyboard, a pointer/selection device (e.g., a mouse, a trackball, a touchpad, a touchscreen, a gesture capture or detecting device, or a stylus), and/or the like. In some embodiments, a client device 130 can include general computing components and/or embedded systems optimized with specific components for performing specific tasks. In some embodiments, a client device 130 can include programs/applications that can be used to generate a request for content, to provide content, to render content, and/or to send and/or receive requests to and/or from other devices via the network 150. For example, a client device 130 may include an Internet browser application that facilitates communication with the data intake and query system 102 via the network 150. In some embodiments, a program, or application, of a client device 130 can include program modules having program instructions that are executable by a computer system to perform some or all of the functionality described herein with regard to at least client device 130.

Figure 2:
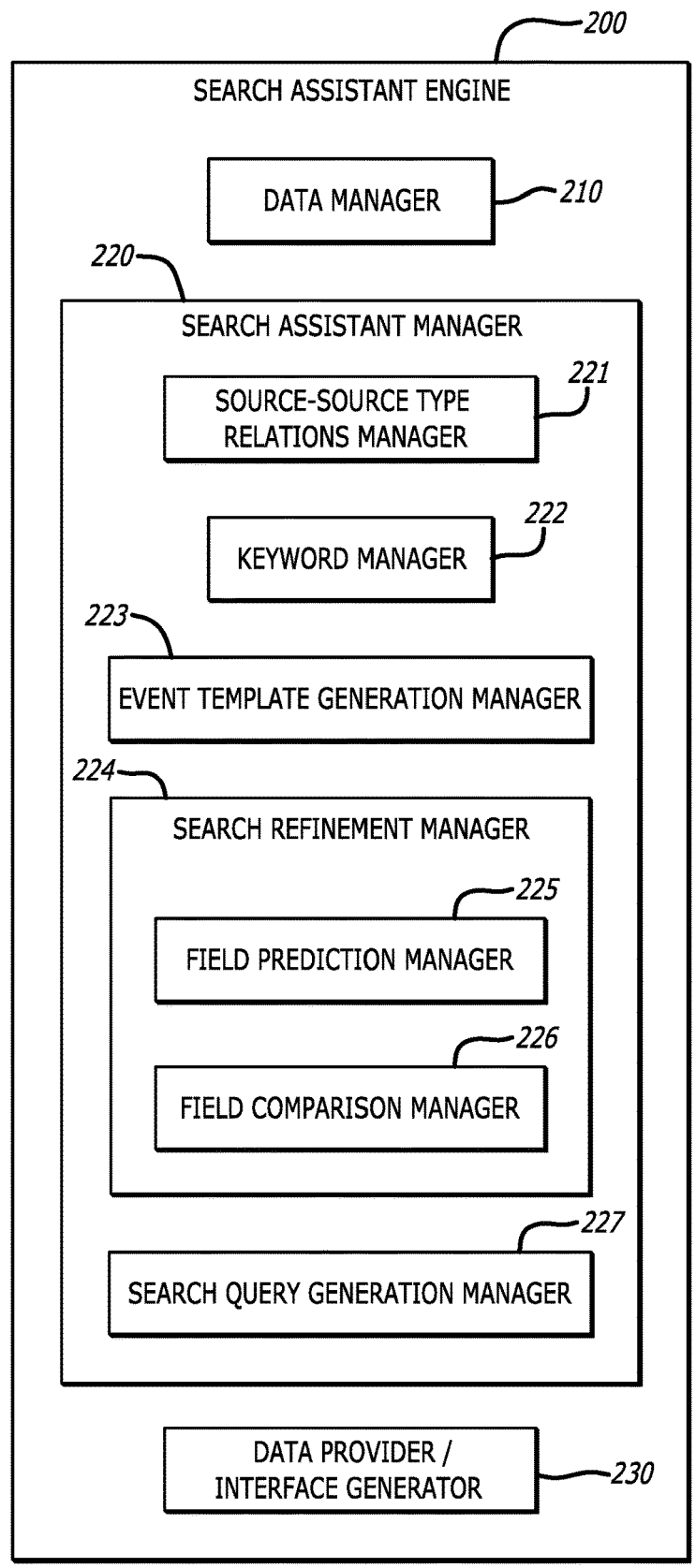
FIG. 2 is a block diagram of a search assistant engine, in accordance with various implementations of the present disclosure.

FIG. 2 is a block diagram of a search assistant engine, in accordance with various implementations of the present disclosure. The search assistant engine 200 is generally configured to execute queries on a user-selected index, perform certain analyses on the query results, and generate visuals from the search results and/or analyses results for display in a user-friendly user interface. To perform such operations, the search assistant engine 200 is comprised of a data manager 210, a search assistant manager 220, and a data provider/interface generator ("interface generator") 230. The search assistant engine 200 can include any number of other components not illustrated. In some embodiments, one or more of the illustrated components 210, 220, and 230 (including any sub-modules) can be integrated into a single component or can be divided into a number of different components. Components 210, 220, and 230 can be implemented on any number of machines and can be integrated, as desired, with any number of other functionalities or services.

The data manager 210 is configured to manage data, such as incoming data points. A data point generally refers to any data, such as an observed data. An incoming data point, or current data point, refers to a data point that is arriving at the search assistant engine 200, which may include retrieval through execution of one or more search queries. In some embodiments, a data point corresponds with a time series data set. As such, an incoming data point can be one of a sequence of data points of a time series data set collected over time.

Generally, the data manager 210 obtains an incoming data point, for example, provided via a data source (such as the data source 140). The data manager 210 can obtain or collect data points from any number of data sources. As one example, data points observed and collected at client devices or servers can be provided to the data manager 210. In this regard, as a data point is observed or collected at a client component, the client component can communicate the data point to the search assistant engine 200 such that data points are obtained at the data manager 210 in an ongoing or streaming manner (e.g., a most recently received data point without having obtained subsequent data points).

The data manager 210 can provide obtained data points to a data store (e.g., the storage 116). As can be appreciated, the data point can be stored in the data store in association with a particular metric. That is, an incoming data point may be a part of a time series data set associated with a particular metric. A metric generally refers to any type or category of measurement, such as, for example, a performance metric or a security metric. For example, a time series data set may relate to a particular performance or usage of containers, hosts, CPU, memory, or the like.

Additionally, or alternatively, the data manager 210 may provide incoming data points to the search assistant manager 220 for data processing. As such, upon obtaining a data point, the data manager 210 may provide the data point to the search assistant manager 220 in a real-time basis for performing data decomposition.

The search assistant manager 220 includes a plurality of sub-modules that perform certain tasks upon execution by one or more processors, e.g., of the data intake and query system 102 or on which the data intake and query system 102 processes. In some examples, the sub-modules include a source—source type relations manager 221, a keyword manager 222, an event template generation manager 223, a search refinement manager 224 (including yet further sub-modules such as a field prediction manager 225 and a field comparison manager 226), and a search query generation manager 227.

Figure 10:
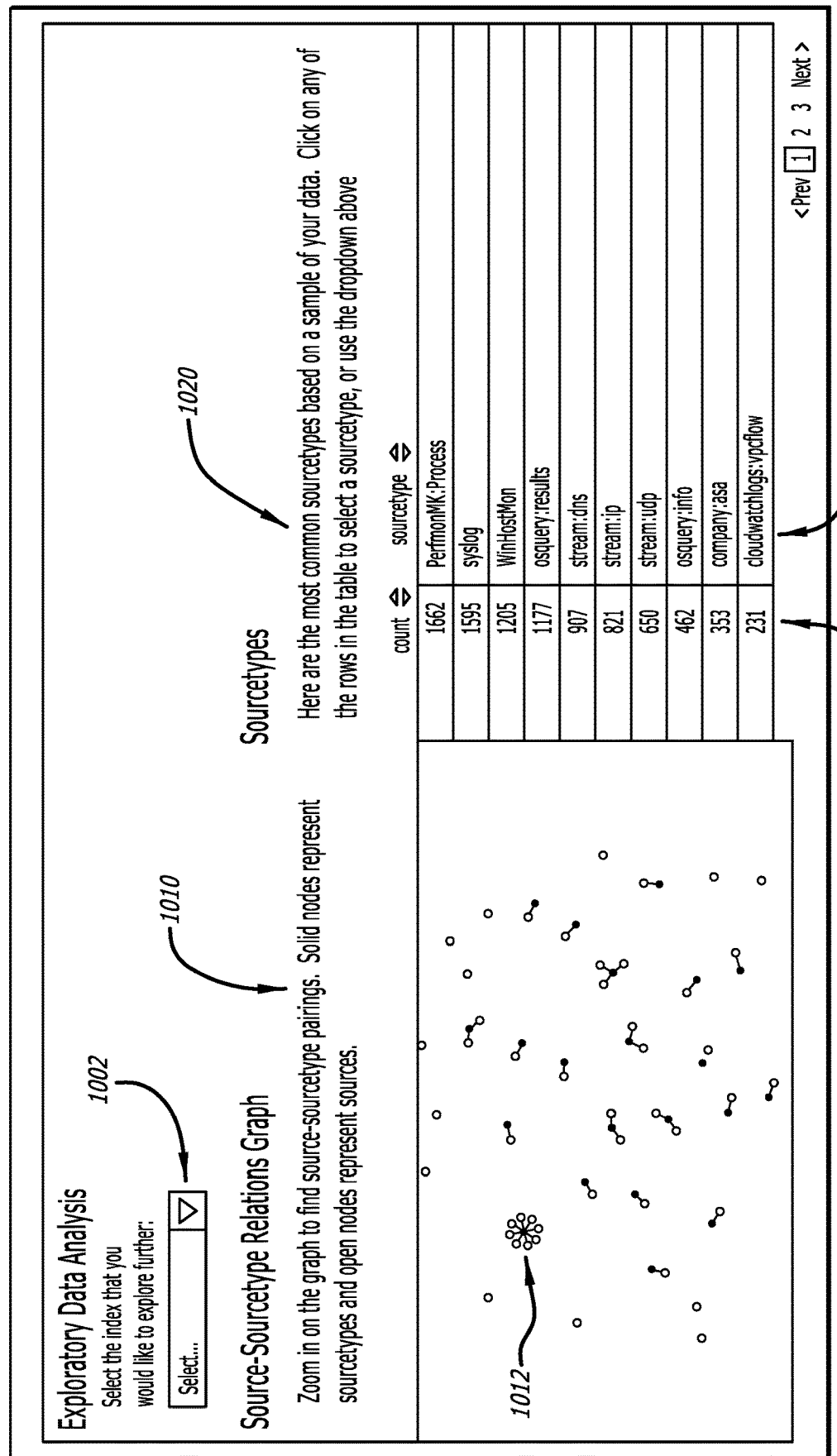
FIG. 10 is an example user interface portion corresponding to the index/source type selection and source—source type relations display sections of FIG. 9, according to implementations of the present disclosure.

Generally, the search assistant engine 200 may be configured to receive user input corresponding to selection of an index, as seen in FIG. 10, and as noted above, an index is a data storage structure in which events are stored. The selection of an index provides the search assistant engine 200 with a particular location of data the user desires to explore. The sub-modules of the search assistant engine 200 operate to retrieve event data from the selected index or perform various analyses on the retrieved event data.

In some examples, the source—source type relations manager 221 determines the sources and source types present in the events stored at the selected index. As noted below, a source type identifies the data source that produced a particular event and describes a possible data structure of event data produced by the data source. For example, the source type can indicate which fields to expect in events generated at the data source and the keys for the values in the fields, and possibly other information such as sizes of fields, an order of the fields, a field separator, and so on. In some instances, a parsing module of an indexing system (see FIG. 17) may determine the source type from the event data and provide source types to the source—source type relations manager 221. The source—source type relations manager 221 may assist in generation of certain graphic visuals of source—source type pairings (see FIG. 10). Further, the source—source type relations manager 221 determine a count of each source type within the events stored at the selected index, where the count of each may be utilized in generation of a ranked listing (see FIG. 10).

In some implementations, a user is instructed to select a source type before continuing exploration of the user interface. For instance, one a source type is selected, data may be displayed on subsequent display portions of the user interface in accordance with the selected source type (e.g., events displayed will be generated by sources of the selected source type and analyses performed will be on the same). As used herein, the terms "display portions" and "user interface portions" may be used interchangeably.

In some implementations, the keyword manager 222 may be configured to receive user input corresponding to search strings (e.g., keywords) that are used as a filter when retrieving event data from the selected index and/or displaying query results. Additionally, in some implementations, the search strings may be imported directly into automatically generated search queries (see FIG. 15). In some implementations, the keyword manager 222 may also be configured to receive user input corresponding to a number of events to be loaded as input to the search assistant engine 200.

In some implementations, the event template generation manager 223 performs operations to generate a set of event templates including performing a clustering of the retrieved events, and for each cluster: (i) determining wildcards within the events of the cluster, and (ii) determining a corresponding field for each wildcard, where a field name is displayed in place of a wildcard character or term. More specifically, in some implementations, a pipelined search query may be executed to perform the clustering, where the pipelined search query includes a clustering command that breaks down the events into terms and computes the vector between events. A similarity threshold may be adjusted to alter how discriminating the clustering command is as to which events are grouped together. In such implementations, the result of the cluster command may append two new fields to each event, which correspond to a cluster count and a cluster label. The cluster count value is the number of events that are part of the cluster, or the cluster size. Each event in the cluster is assigned the cluster label value of the cluster to which it belongs. For example, if the search returns 10 clusters, then the clusters are labeled from 1 to 10 (or 0-9, or an equivalent).

In some implementations, the clustering is a streaming clustering algorithm (e.g., is configured to receive and cluster streaming data, which may refer to data that is received at continuous intervals in data blocks having a known size as well as data that is received at various, unknown intervals in data blocks having known or unknown sizes). For each new event considered, the clustering operations consider whether to assign the new event to an existing cluster or create a new cluster, with the new event as its first member. A new event will be assigned to an existing cluster to which it is most similar, or, if not sufficiently similar to any existing cluster (e.g., based on a similarity threshold comparison), the new event will become the first member of a new cluster.

Once the clustering has been performed, each cluster is then analyzed in order to determine an event template for the cluster. By parsing the text of the events within a cluster, the event template generation manager 223 detects which terms of an event are repeated consistently through the events of the cluster ("static terms") and which terms differ in value ("wildcards"). For example, given the two sample events below in Table 1, the event template generation manager 223 may determine that the terms ":", "Teardown", "connection", and "for" may be determined to repeat consistently (static terms) while the others may be deemed wildcards.

TABLE 1

August 20 15:17:59 ident_1234: Teardown UDP connection 8374793 for 192.168.9.50/68
August 20 15:18:06 ident_abcd: Teardown TCP connection 7174429 for 192.168.9.31/123

Continuing the example, following the determination of the static terms and the wildcards, the event template generation manager 223 populates an event template with the static terms and a wildcard character or term (e.g., *) in place of each wildcard, as shown in Table 2.

TABLE 2

* *: Teardown * connection * for *

Table 3 illustrates that the event template generation manager 223 determines a field corresponding to each wildcard and subsequently replaces the wildcard character with the field name, e.g., with a pair of brackets for visually distinguishing the field names from the static terms. As a result, Table 3 illustrates an event template. Additional event templates are illustrated in FIG. 12. It should be understood that the step of populating an event template with a wildcard character or term may be bypassed such that the event template generation manager 223 jumps directly from the events of Table 1 to the event template of Table 3.

TABLE 3

[time_stamp] [message_id]: Teardown [transport] connection [session_id] for [src_IP]

In some embodiments of the above process, each event of a cluster may be placed as a row within a table, where the table includes a set of columns representing the possible fields for events within that cluster. In other examples, each event of a cluster may have attached thereto (prepended or appended) or otherwise associated with (via metadata), columns representing the possible fields for event with that cluster. The value of a particular field for an event is populated in the applicable column of the event. For example, the value for the field "src_port" of an event will be populated in the column representing "src_port". In some instances, a rules-based methodology is used to identify the fields of an event (e.g., such as in the form of a "technology add-on" within the SPLUNK® processing environment). In other instances, identifying fields of an event may be performed by processing the event with a trained machine learning model.

With respect to the columns of the events of a particular, operations of the above process may include determining, for each column, whether there are a plurality of values in that column. When a plurality of values exist in a particular column, a wildcard is created for that field. For example and with reference to an exemplary "src_port" column, all of the events in a cluster have the same value in the src_port column, a wildcard is not created for the field represented by the "src_port" column. However, when there are a plurality of values in the src_port column, a wildcard is created for the field represented by the "src_port" column.

Additionally, in some embodiments, the process for identifying wildcards may include the following operations: obtaining a list of all the fields utilized by the events comprising a cluster, where the listing will correspond to columns appended to each event; for each column, generating a list of every unique value; sorting the values in the list from longest to shortest; when the first value in the list (which is now also the longest value) is at least more than 2 characters long (indicating a plurality of values for a given field within the cluster), indicating the applicable column is to be replaced with a wildcard; and creating a copy of the events in memory, wherein the copy includes replacement of the values what were in the indicated columns with the name of the field (column). In some instances, the name of the field is surrounded with brackets.

In some examples, the search refinement manager 224 may be configured to perform certain operations that may be performed by sub-modules the field prediction manager 225 and the field comparison manager 226). In some implementations, the field prediction manager 225 determines "interesting" fields by determining a score of mutual information for a set of fields. As noted above, as the user continues to interact with the user interface (e.g., provide user input), the event data may be filtered such that in some implementations, only fields for a selected event type of a selected source type of events stored in a selected index are considered. In other implementations, the field prediction manager 225 may consider fields for all event types of a selected source type of events stored in a selected index or fields within events of all source types of events stored in a selected index. In some implementations, the mutual information score of each field may be determined using Shannon's Entropy through the operations implementing the standard equation for determining mutual information.

In some implementations, the known, standard equation for determining mutual information is utilized as shown below as Equation (1). In some examples, the mutual information equation is incorporated into a set of computerized operations (a computerized methodology, or an algorithm), which may be configured to receives two fields as input, where the computerized operations determine the mutual information score between the two fields received as input.

$$I(X;Y) = H(X) - H(X|Y)$$

$$= \sum_{x \in X} \sum_{y \in Y} p(xy) \log \frac{p(xy)}{p(x)p(y)}$$

Equation (1)

Equation (1) represents the calculation for computing the mutual information score between two discrete random variables (X and Y), where p(x) and p(y) are the marginal probability density functions for X and Y, respectively, and p(xy) is the joint probability density function. Additionally, H(X) represents the entropy of X and H(X|Y) represents the conditional entropy measuring the level of uncertainty of X when the value of Y is known.

Figure 13:
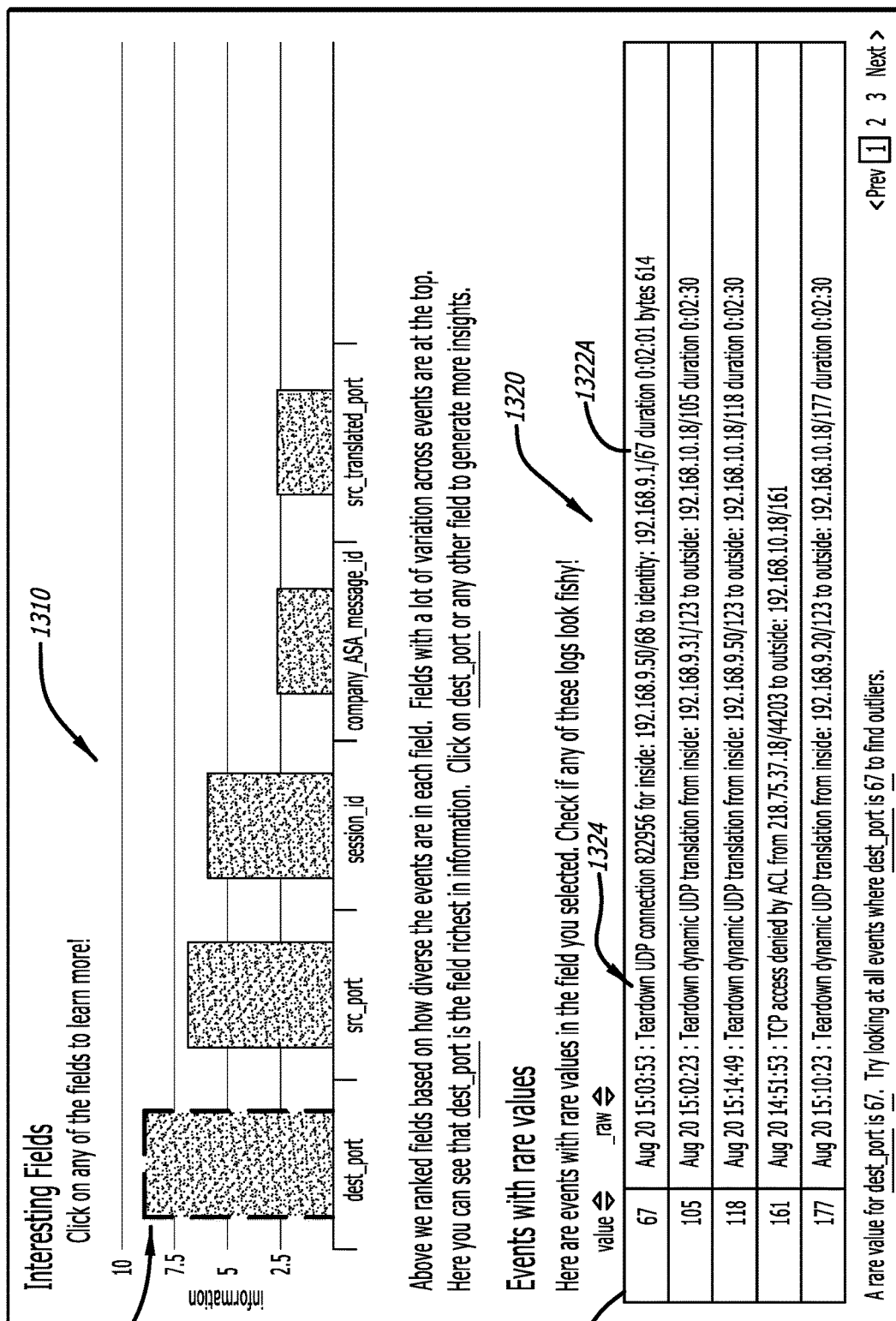
FIG. 13 is an example user interface portion corresponding to the field information display section of FIG. 9, according to implementations of the present disclosure.

In some implementations, fields with a large diversity in values may have a higher mutual information with a set of fields having the highest mutual information score being displayed in the user interface (e.g., graphically as a bar chart, see FIG. 13). Further, the field prediction manager 225 may perform an analysis to determine events having rare values in a particular field. In some instances, e.g., as a default (no user input), the field with the highest mutual information is selected for analysis of events having rare values. In other instances (with user input), the analysis to determine events having rare values is performed on a user-selected field. In some implementations, a graphic (e.g., a table) may be displayed that provides a side-by-side listing of a rare value and the event (e.g., as a string of alphanumeric and other characters) (see FIG. 13). In some instances, the user input indicating selection of a field may include selection of a bar in a bar chart, where each bar represents a particular field (see FIG. 13).

In some implementations, the field comparison manager 226 performs operations to establish field groupings based on a mutual information of each grouping and provide a ranked/scored listing of the field groupings (e.g., where a field grouping may comprise any number of a plurality of fields such as fields (a, b), (a, b, c), (a, c), (a, c, d), etc., where a-d represent possible fields). For instance, the field comparison manager 226 may analyze all possible combinations of field groupings (e.g., a grouping of just two fields through a grouping of all fields) by computing the mutual information of each field grouping (e.g., (a, b), . . . , (a, z), . . . (a, b, c, . . . , z), etc.)). A mutual information score for each field grouping rewards inclusion of highly informative fields within a field grouping and penalizes inclusion of additional fields. Thus, the mutual information score provides a ranking of field groupings that provide the user with informative data without inundating the user with unnecessary information. In some implementations, the mutual information score of each field grouping may be determined using Shannon's Entropy through numerous operations discussed as follows.

First, a subset of the operations are directed to determining which pairs of fields to compare as the determination of a mutual information score utilizes a pair of fields as input. As noted above, field groupings may comprise two or more fields while the mutual information score is computed for a pair (2) at a time. Given a set of N fields, there are "N choose 2" pairs of fields that could possibly be input to the mutual information function at a time, where N choose 2 represents the possible number of combinations of pairs of fields. In some embodiments, one optional operation of the subset includes removing certain fields from the set of N fields such as those provided by a data intake and query system 102 (e.g., sourcetype, timestamp). An additional operation of the subset may include performing preprocessing on the values within the set of N fields (or remaining fields), which may also be referred to as "cleaning" the values. The preprocessing may include one or more of: populating missing values (e.g., with default values such as 1, 0, the value of a neighboring event where neighboring is determined by timestamp, an average of the values of neighboring events as determined by timestamp, etc.); and/or dropping extreme values for numeric fields (where extreme may be defined relative to the set of values for that field, where values outside of threshold percentage from the median value may constitute extreme).

In some instances, a sampling operation is performed to make the mutual information calculations more efficient. Once the values in the fields have been preprocessed and sampled, the mutual information between the remaining combinations is calculated as discussed below. In some instances, where there are more than 100 pairs of fields to compare, a subset of the combinations are utilized, such as those pairs with the highest mutual information values (e.g., 90th percentile and above), where the mutual information value of each pair is calculated using Equation (1).

To determine a mutual information score for the field groupings, an operation is performed that iterates through the pairings and their mutual information values such that when a first pairing and a second pairing share a field and each have a high mutual information score ("high" being above a threshold value), the two pairs are grouped together into a field grouping. For example, consider the following pairs of fields (a, b), (a, c), and (b, c). If at least two of these pairs have high mutual information scores, the grouping of (a, b, c) is formed. Additionally following iteration through all pairings, for each grouping, a representative field is determined, where the representative field is the field that has the highest mutual information with all the other fields in the grouping. For example, using the grouping (a, b, c), field (a) is determined to be the representative field when the mutual information scores between (a, b) and (a, c) is higher than the mutual information scores between (a, b) and (b, c) and also higher than the mutual information scores between (a, c) and (b, c), where an average of the mutual information scores may be utilized. In some implementations, the mutual information score for a grouping may be the average of the mutual information score for each pair comprising the grouping. For example, the mutual information score for (a, b, c) may be the average of the mutual information scores for (a, b), (a, c), and (b, c).

Additionally, in some implementations, the field comparison manager 226 also performs operations to compare values across certain fields within a field grouping. For instance, such a comparison may include determining a count of each time the values across two fields are a particular pair (see FIG. 14). To carry out this comparison, the field comparison manager 226 may parse each event current being analyzed (e.g., accounting for any filtering, search strings, or selections through user input as previously discussed) and keep counts for each time the values across two fields are a particular pair. The field comparison manager 226 may then facilitate display of a ranked listing of the value pairs. In some implementations, two fields are automatically selected by the field comparison manager 226, where the selected fields may be the fields in a field pairing consisting of only two fields (e.g., the highest scoring field grouping of only two fields). In some implementations, the default selection may only occur when the highest scoring field grouping consists of only two fields. In other implementations, the user interface may be configured to receive user input (e.g., from a dropdown list) indicating selection of two fields from a selected field grouping (or from the highest scoring field grouping). Thus, a user may easily spot any anomalies with certain field value pairings (e.g., if a certain pairing occurs far more than expected).

Further, in some examples, the search query generation manager 227 retrieves user input received by various portions of the user interface and imports aspects of the user input into predetermined search query templates. For example, selections of an index, a source type, an event type, and/or selected fields may be imported. In other instances, aspects of search query execution results and/or processing of search query execution results may be imported (see FIG. 15). In some implementations, each predetermined search query template is configured to pertain to a category (e.g., event types, rare values, anomaly detection, data hygiene, field inspection, etc.) and return a search query result enabling the user to perform a certain task (e.g., explore rare event types). Thus, each of the predetermined search query templates is specifically configured (i) to return results enabling the user to advantageously perform a task and (ii) with particular terms retrieved by the search assistant engine 200 during user interactions with the user interface as described above. Thus, for example, as a user explores the user interface interacting therewith to select an index and a source type, and provide a search string, such information may be pulled and imported into any of the predetermined search query templates. As a result of importing certain terms into the predetermined search query templates, the user is presented with a set of executable search queries configured to provide task-specific data and that are uniquely tailored in accordance with the user's prior interactions.

The interface generator 230 is generally configured to provide identified data components for a data point for data analysis and/or generate certain visuals based on query results and/or analyses results. As such, data points and/or corresponding data components can be provided in a streaming manner as the data components are identified. In embodiments, the data points and/or corresponding data components may be provided for display to a user, for example, via a user device. Such data may be presented in any number of ways including data values, charts, graphs, etc., and may be configured to user interaction (e.g., configured to receive user input such as selection of a bar within a bar graph visual). For example, with reference to FIGS. 10-15, various display portions of a user interface are populated with event data and graphics based on results of executing one or more search queries and results of analyses thereof.

Figure 3:
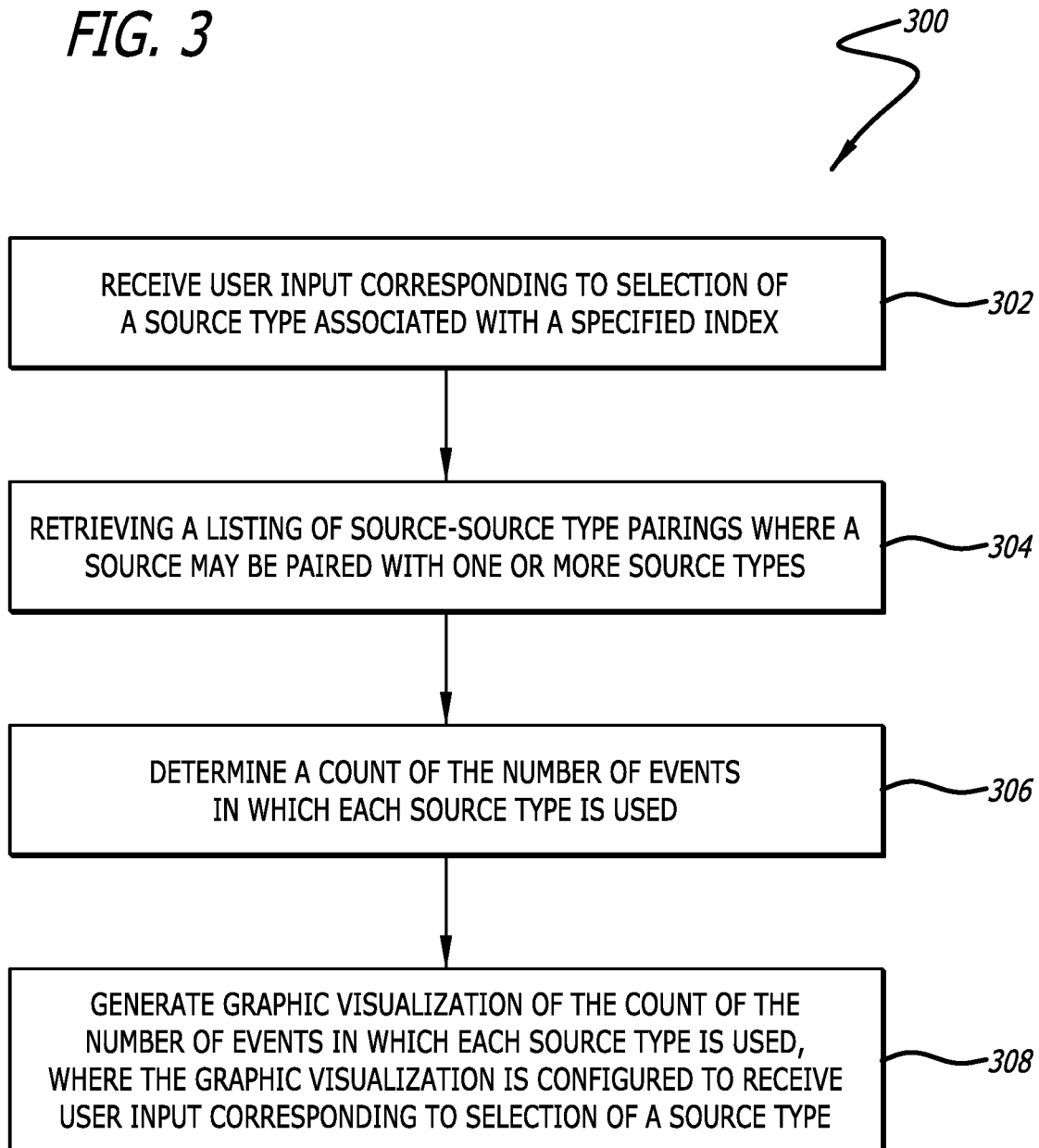
FIG. 3 is a flowchart of an illustrative method of performing source-source type relationship identification, according to implementations of the present disclosure.

FIG. 3 is a flowchart of an illustrative method of performing source—source type relationship identification, according to implementations of the present disclosure. Each block illustrated in FIG. 3 represents an operation of the process 300. It should be understood that not every operation illustrated in FIG. 3 is required. In fact, certain operations may be optional to complete aspects of the method 300. The method 300 begins with an operation of receiving user input corresponding to a selection of a source type associated with a specified index (block 302). Subsequently, the method 300 continues with retrieving a listing of source—source type pairings of the specified index, where a source may be paired with one or more source types (block 304).

Upon obtaining a listing of source—source type pairings of the specified index, a count of the number of events in which each source type is used is determined (block 306). Further, a graphic visualization may be generated that includes a display of the source—source type pairings and/or a listing of the count of the number of instances of events in which certain source types are present (block 308). One example of the graphic visualization is shown in FIG. 10 with the display of the source—source type pairings appearing on the left-hand side and the listing of the count of the number of instances of events in which certain source types are present appearing on the right-hand side.

Figure 4:
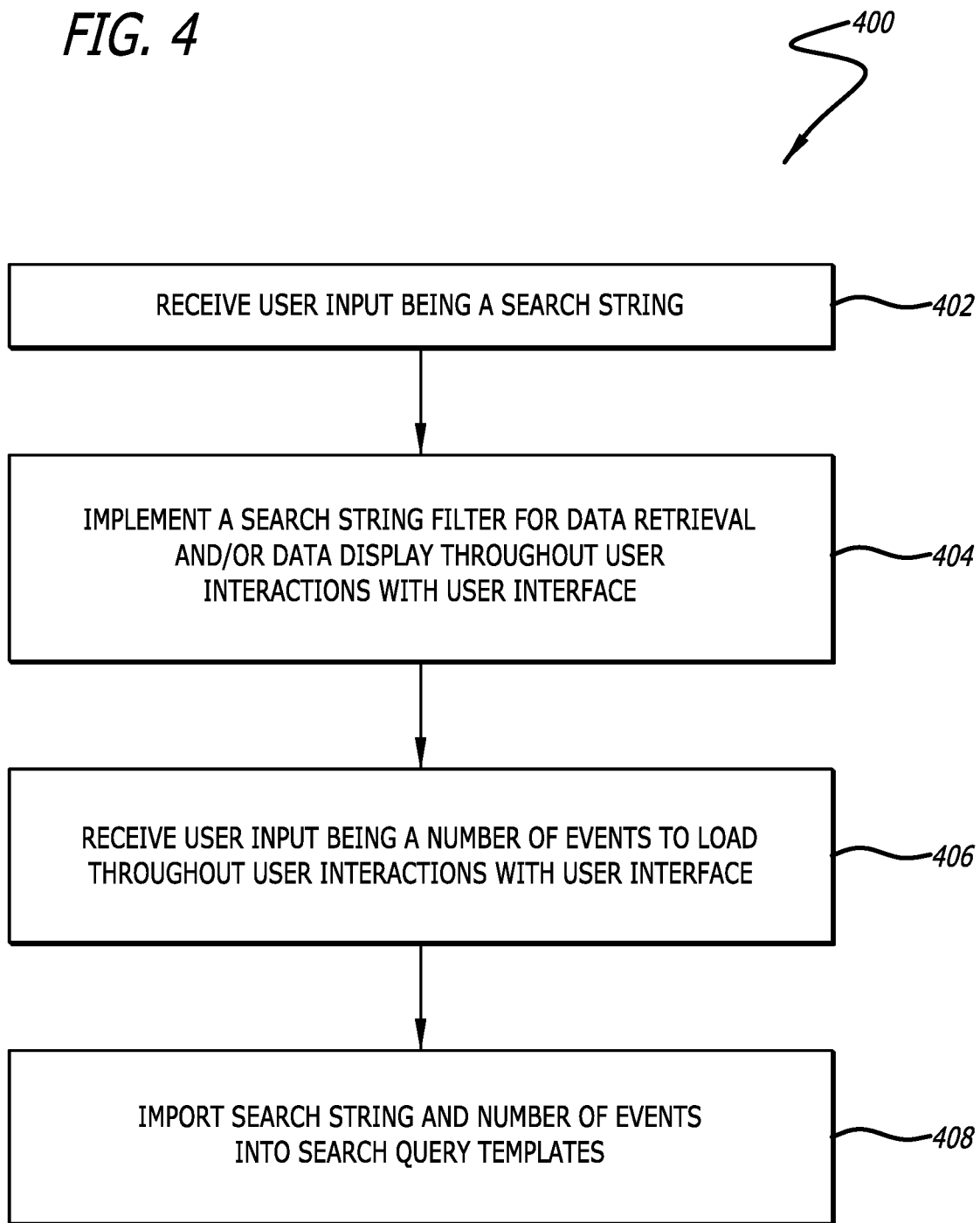
FIG. 4 is a flowchart of an illustrative method of performing filtering of the retrieval or display of search query results based on a received search string, according to implementations of the present disclosure.

FIG. 4 is a flowchart of an illustrative method of performing filtering of the retrieval or display of search query results based on a received search string, according to implementations of the present disclosure. Each block illustrated in FIG. 4 represents an operation of the process 400. It should be understood that not every operation illustrated in FIG. 4 is required. In fact, certain operations may be optional to complete aspects of the method 400. The method 400 begins with an operation of receiving user input corresponding to a search string (block 402). A search string filter is then implemented for data retrieval (e.g., execution of search queries) and/or data display (e.g., results of search queries and/or analyses of such results) (block 404). As discussed throughout the disclosure, the search assistant engine provides a user interface comprised of numerous display portions and upon receipt of a search string, a corresponding search string filter is applied to data retrieval and/or data display with respect to data retrieved or displayed in subsequent display portions (e.g., in implementations in which the displays are arranged in a top-down order such as that shown in FIG. 9).

Further, the method 400 continues with receipt of additional user input being a number of events to load throughout the user interface and utilize in analyses (block 406). In some examples, the number of events provided by the user serves as a maximum number of events to load. For instance, the number of events stored at a specified index may be in the tens of thousands (or more). A user may limit the number of events retrieved for viewing and/or analyses by indicating a maximum number of events, which may correspond to a random selection of the events stored at a specified index or the most recent events according to associated timestamps.

Additionally, the search string may be imported into one or more predetermined search query templates (block 408). As discussed herein, certain data retrieved from the user interactions with the user interface is imported into the predetermined search query templates thereby providing the user with executable search query statements that are uniquely tailored based on the user interactions (e.g., specifying an index, a source type, an event type, and/or selection of results of any analyses by the search assistant engine) and directed to providing the user with data pertaining to a specific task (e.g., exploring review events or anomaly detection).

Figure 5:
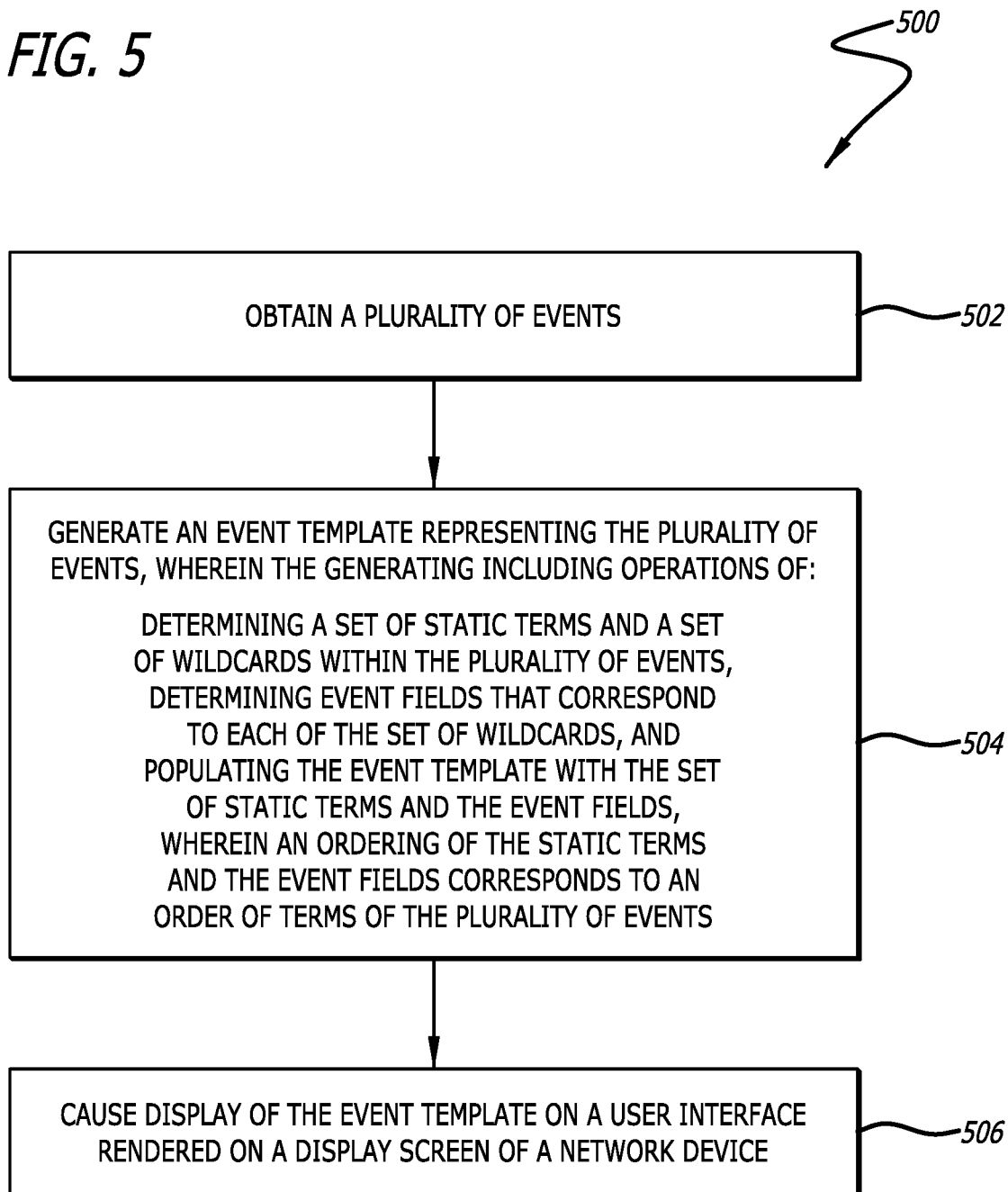
FIG. 5 is a flowchart of an illustrative method of performing automated generation of event template strings including wildcard field identification, according to implementations of the present disclosure.

FIG. 5 is a flowchart of an illustrative method of performing automated generation of event template strings including wildcard field identification, according to implementations of the present disclosure. The example method 500 can be implemented, for example, by a computing device that comprises a processor and a non-transitory computer-readable medium. The non-transitory computer readable medium can be storing instructions that, when executed by the processor, can cause the processor to perform the operations of the illustrated method 500. Alternatively, or additionally, the method 500 can be implemented using a non-transitory computer-readable medium storing instructions that, when executed by one or more processors, case the one or more processors to perform the operations of the method 500 of FIG. 5.

Each block illustrated in FIG. 5 represents an operation of the method 500. It should be understood that not every operation illustrated in FIG. 5 is required. In fact, certain operations may be optional to complete aspects of the method 500. The method 500 begins with an operation of obtaining a plurality of events, which may comprise event data (block 502). The method 500 continues with generating an event template representing the plurality of event (block 504). More specifically, generating an event template includes operations of determining a set of static terms and a set of wildcards within the plurality of events, determining event fields that correspond to each of the set of wildcards, and populating the event template with the set of static terms and the event fields, wherein an ordering of the static terms and the event fields corresponds to an order of terms of the plurality of events. Further, the event template is displayed on a user interface rendered on a display screen of a network device (block 506).

Figure 6:
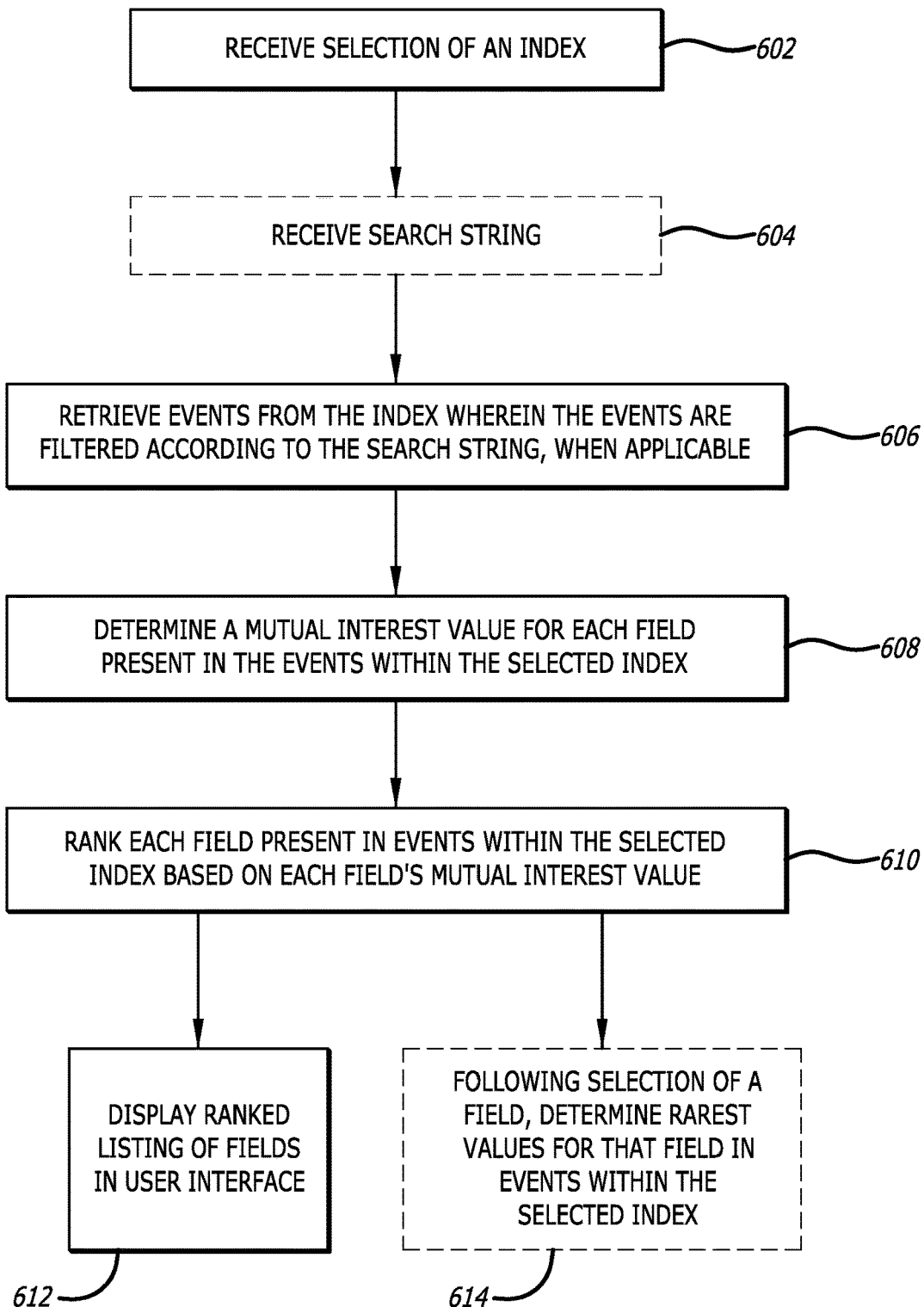
FIG. 6 is a flowchart of an illustrative method of determining mutual information between fields of events within a selected index, according to implementations of the present disclosure.

FIG. 6 is a flowchart of an illustrative method of determining mutual information between fields of events within a selected index, according to implementations of the present disclosure. Each block illustrated in FIG. 6 represents an operation of the process 600. It should be understood that not every operation illustrated in FIG. 6 is required. In fact, certain operations may be optional to complete aspects of the method 600. The method 600 begins with operations of receiving as user input selection of an index and, optionally, a search string (blocks 602, 604).

The method 600 continues with retrieving events from the selected index, where the events are filtered according to the search string, when applicable (block 606). In some instances, the search string may be incorporated into search queries that are executed to retrieve event data. In other instances, the search string is implemented to filter the display of retrieved event data such that only event data including the search string is displayed and/or incorporated into the various analyses performed by the search assistant engine (e.g., determination of a mutual information of fields of the event data).

Following retrieval of the event data from the selected index, a mutual information score is determined for the fields present in the retrieved event data (block 608). As discussed above, the mutual information value (e.g., score) for a particular field is determined through the use of a known calculation for computing mutual information (see Equation (1)). In some embodiments, the mutual information score for each field may be determined with respect to each other field and the computed scores may be averaged. The fields may then be ranked against each other according to each's averaged mutual information score.

Subsequently, the fields present within event data of the selected index are ranked according to each field's mutual information score and a ranked list of the fields is displayed in a user interface (blocks 610, 612). Optionally, a determination may be made as to rare values for a particular field and the events that include a rare value may also be displayed on the user interface (block 614). FIG. 13 provides an illustrative example of the display of the user interface referenced in blocks 612, 614.

Figure 7:
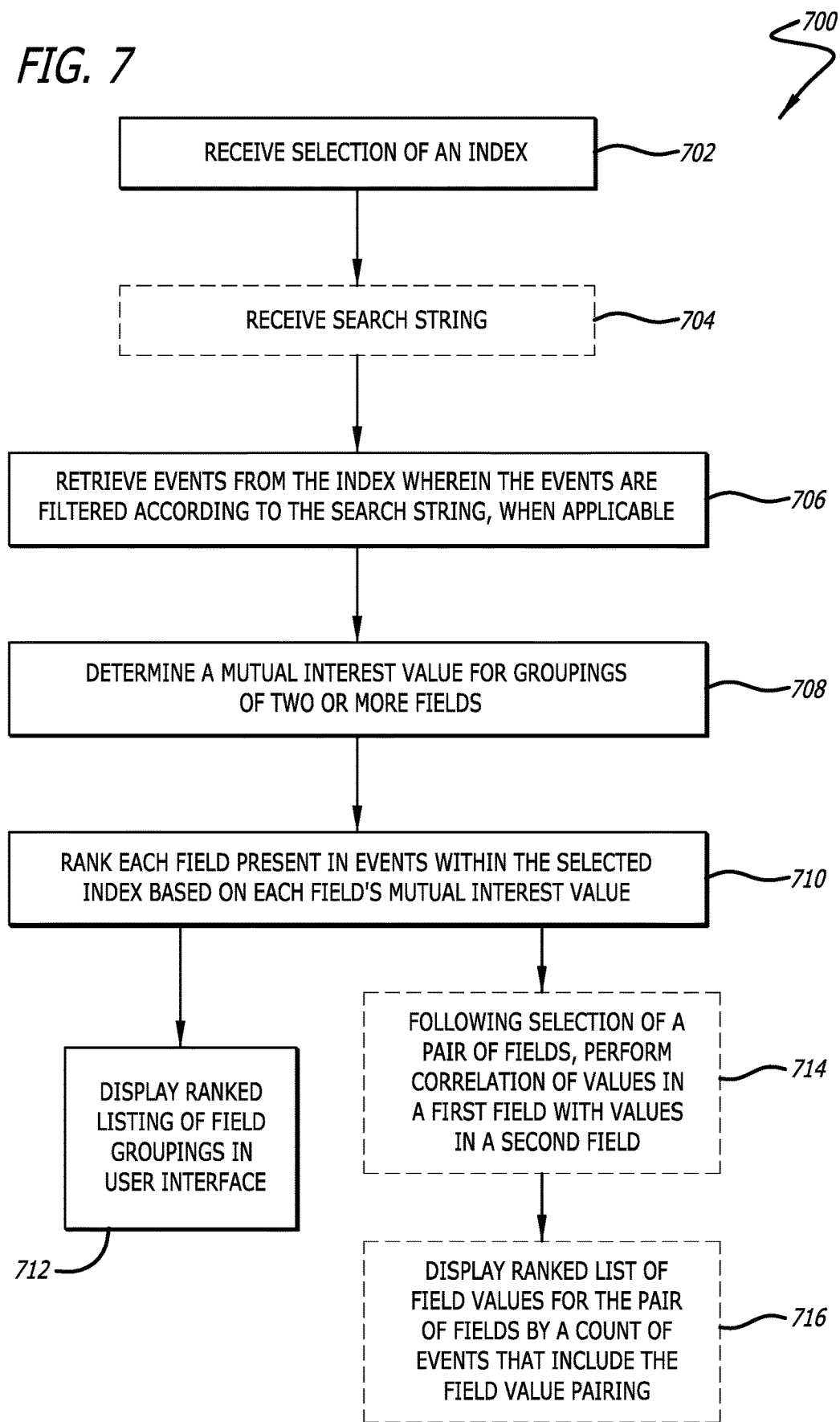
FIG. 7 is a flowchart of an illustrative method of determining groupings of fields of events within a selected index based on a mutual information determination, according to implementations of the present disclosure.

FIG. 7 is a flowchart of an illustrative method of determining groupings of fields of events within a selected index based on a mutual information determination, according to implementations of the present disclosure. Each block illustrated in FIG. 7 represents an operation of the process 700. It should be understood that not every operation illustrated in FIG. 7 is required. In fact, certain operations may be optional to complete aspects of the method 700. The method 700 begins with operations of receiving as user input selection of an index and, optionally, a search string, and retrieving events from the selected index, where the events are filtered according to the search string, when applicable (blocks 702, 704, 706). The search string may be incorporated into search queries or display filtering as discussed above with respect to the method 600.

Following retrieval of the event data from the selected index, a mutual information score is determined for groupings of fields present in the retrieved event data (block 708). A mutual information score may be determined for each possible combination of fields or merely a subset thereof. As discussed above, the mutual information value (e.g., score) for a field grouping is determined through operations discussed above pertaining to establishing field groupings based on a mutual information of each grouping and providing a ranked/scored listing of the field groupings (e.g., where a field grouping may comprise any number of a plurality of fields such as fields (a, b), (a, b, c), (a, c), (a, c, d), etc., where a-d represent possible fields). For instance, the field comparison manager 226 may analyze all possible combinations of field groupings (e.g., a grouping of just two fields through a grouping of all fields) by commuting the mutual information of each field grouping (e.g., (a, b), . . . . (a), z), . . . (a, b, c, . . . , z), etc.)).

Subsequently, the field groupings are ranked according to each grouping's mutual information score and a ranked list of the groupings is displayed in a user interface (blocks 710, 712). Optionally, a correlation may be performed to determine the field value pairings of a first and second field (e.g., what which values of the second field are present in an event for a particular value of the first field) and a listing of the field value pairings ranked according to their count may be displayed in the user interface (blocks 714, 716). FIG. 14 provides an illustrative example of the display of the user interface referenced in blocks 712, 716.

Figure 8:
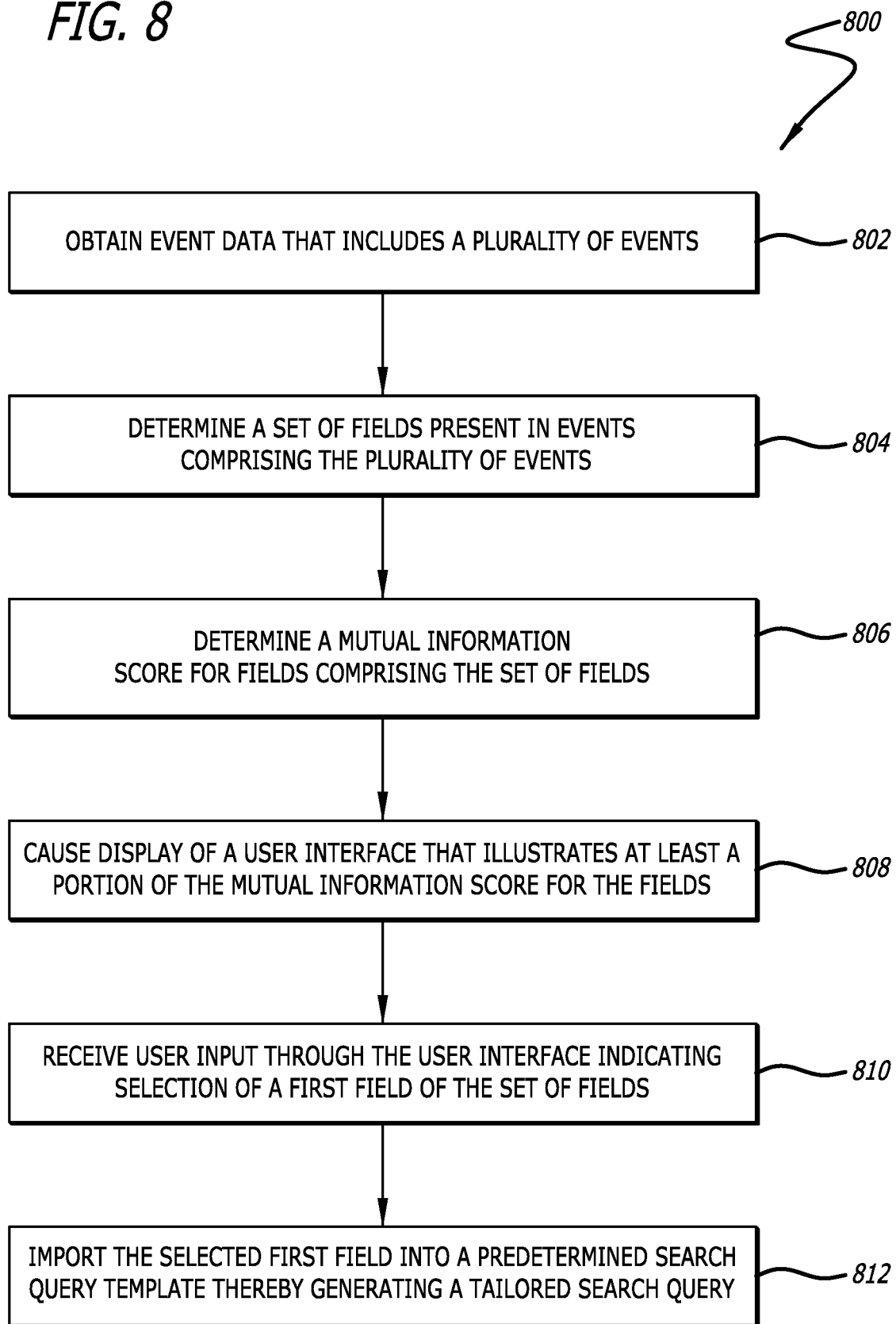
FIG. 8 is a flowchart of an illustrative method of automated search query generation including importing terms from user interaction with a user interface, according to implementations of the present disclosure.

FIG. 8 is a flowchart of an illustrative method of automated search query generation including importing terms from user interaction with a user interface, according to implementations of the present disclosure. The example method 800 can be implemented, for example, by a computing device that comprises a processor and a non-transitory computer-readable medium. The non-transitory computer readable medium can be storing instructions that, when executed by the processor, can cause the processor to perform the operations of the illustrated method 800. Alternatively, or additionally, the method 800 can be implemented using a non-transitory computer-readable medium storing instructions that, when executed by one or more processors, case the one or more processors to perform the operations of the method 800 of FIG. 8.

Each block illustrated in FIG. 8 represents an operation of the process 800. It should be understood that not every operation illustrated in FIG. 8 is required. In fact, certain operations may be optional to complete aspects of the method 800. The method 800 begins with an operations of obtaining event data that includes a plurality of events and determining a set of fields present in events comprising the plurality of events (blocks 802, 804).

The method 800 continues with determining a mutual information score for fields comprising the set of fields and causing display of a user interface that illustrates at least a portion of the mutual information score for the fields (blocks 806, 808). More specifically, determining a mutual information score for fields comprising the set of fields is performed through the use of a known calculation for computing mutual information (see Equation (1)) as discussed above.

Further, user input is received through the user interface indicating selection of a first field of the set of fields and the selected first field is imported into a predetermined search query template thereby generating a tailored search query (blocks 810, 812).

Figure 9:
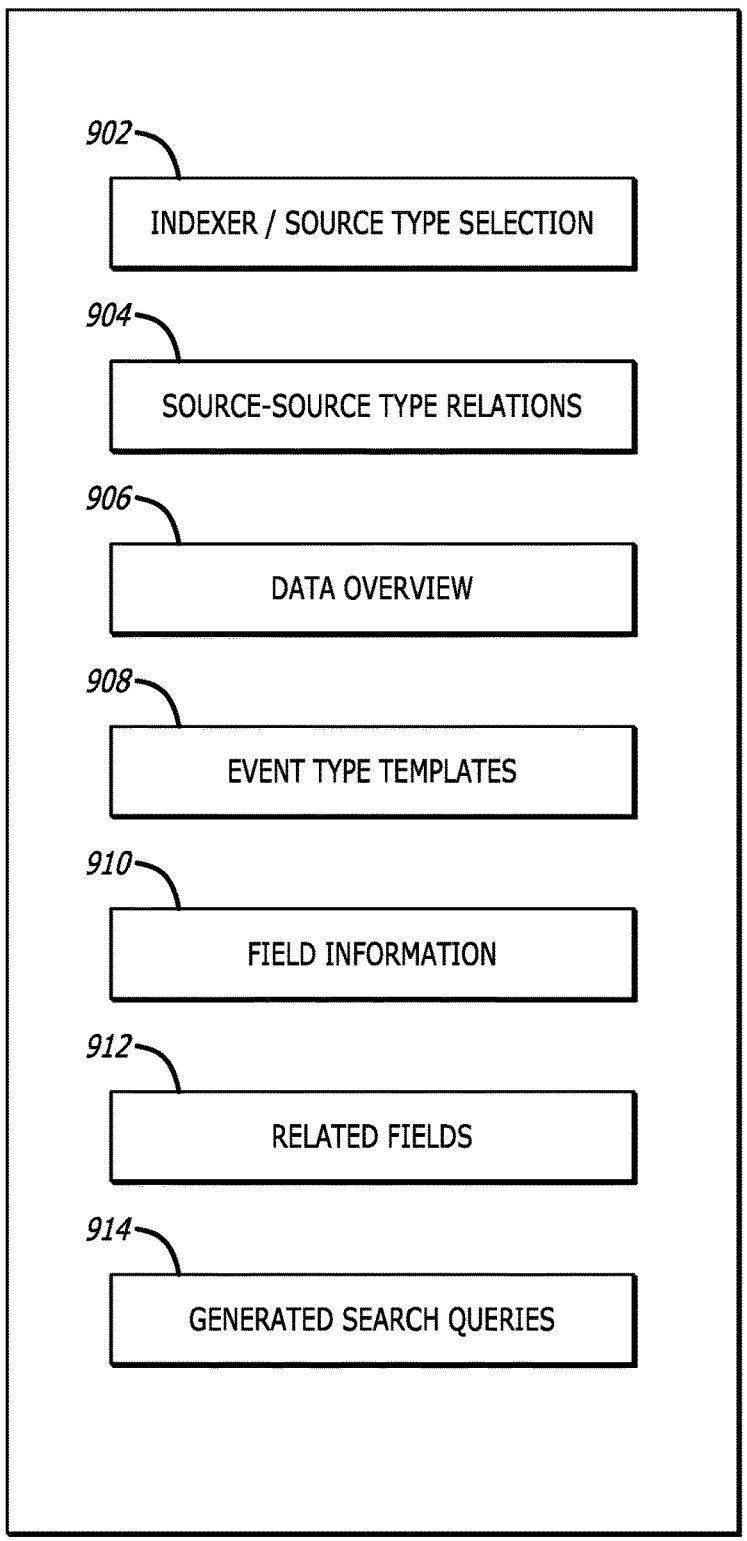
FIG. 9 is a box diagram of an illustrative user interface configured to receive user input and display search query or data analysis results in accordance with the flowcharts of FIGS. 3-8, according to implementations of the present disclosure.

FIG. 9 is a box diagram of an illustrative user interface configured to receive user input and display search query or data analysis results in accordance with the flowcharts of FIGS. 3-8, according to implementations of the present disclosure. The illustrative user interface 900 provides a high-level view of an example layout of how the display portions 902-914 may be arranged, where the display portions 902-914 correspond to the display portions illustrated in FIGS. 10-15. It should be noted that other arrangements have been contemplated. However, FIG. 9 provides a top-down arrangement, where user input received by an upper display portion affects the displays of lower display portions. For example, user input received in the display portion 902 affects the content displayed by display portions 904-914.

Figure 11:
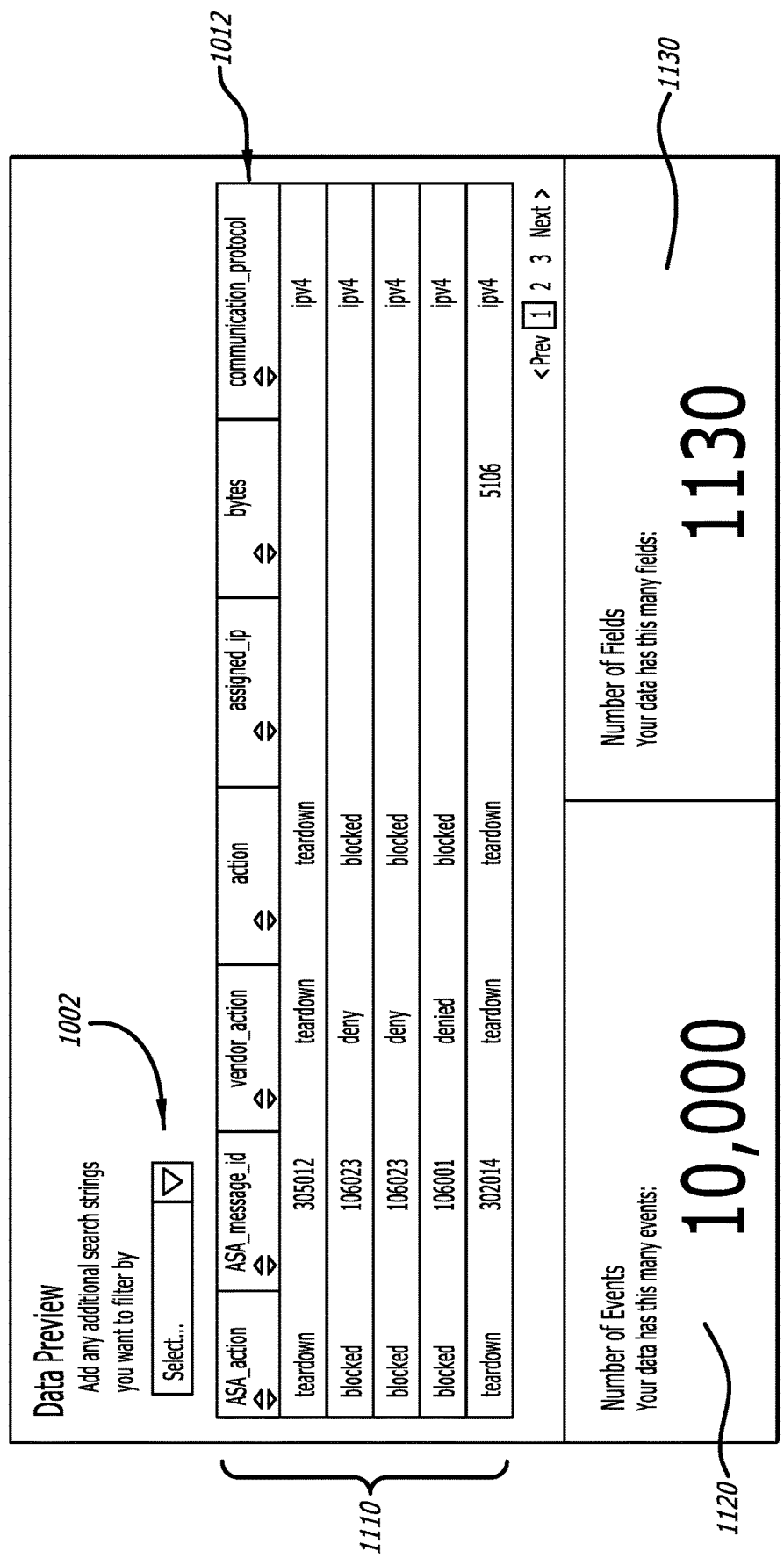
FIG. 11 is an example user interface portion corresponding to the data overview display section of FIG. 9, according to implementations of the present disclosure.

In some implementations, the display portions 902, 904 correspond to the display portion of FIG. 10, the display portion 906 corresponds to the display portion of FIG. 11, the display portion 908 corresponds to the display portion of FIG. 12, the display portion 910 corresponds to the display portion of FIG. 13, the display portion 912 corresponds to the display portion of FIG. 14, and the display portion 914 corresponds to the display portion of FIG. 15.

FIG. 10 is an example user interface portion corresponding to the index/source type selection and source—source type relations display sections of FIG. 9, according to implementations of the present disclosure. The user interface portion 1000 includes an index selection component 1002, a source—source type relations graphical visualization 1010, and a common source types count visualization 1020. In some implementations, the index selection component 1002 may be any of various user interface elements (UI elements) configured to receive user input. In one example, as shown, the UI element may be a dropdown element that provides a user with possible indexes for selection.

In the implementation shown, the source—source type relations graphical visualization 1010 includes a display of node clusters, where a solid node represents a source type, and an open node represents a source. For instance, the node cluster 1012 represents that a first source type is associated with a plurality (e.g., seven) sources.

Additionally, the common source types count visualization 1020 provides a graphic (e.g., a table) of a listing of source types ranked according to the count of each source type as used within the event data at the selected index. As the text of FIG. 10 indicates, the rows of the common source types count visualization 1020 are configured to receive user input (e.g., selection), which results in selection of the corresponding source type. As discussed above, this user input may be utilized as a filter for data retrieval and/or data display for subsequent user interface portions (e.g., those of FIGS. 11-15). Although not shown, a second dropdown element may be provided that is configured to receive user input indicating selection of a source type (e.g., the second dropdown may appear upon selection of an index via the index selection component 1002).

FIG. 11 is an example user interface portion corresponding to the data overview display section of FIG. 9, according to implementations of the present disclosure. The user interface portion 1100 includes a search string receiving component 1102, a data preview visualization 1110, a number of events display 1120, and a number of fields display 1130. In some implementations, the search string receiving component 1102 may be any of various UI elements configured to receive user input. In one example, as shown, the UI element may be a textbox element that receives text.

The data preview visualization 1110 may be a table including a set of rows with each row corresponding to an event, and a set of column headers 1112 with each column corresponding to a field of the displayed events. The number of events display 1120 provides an indication of the number of events retrieved from a selected index and associated with a selected source type (see FIG. 10), and the number of fields display 1130 provides a count of the total number of fields present in the retried event data.

FIG. 12 is an example user interface portion corresponding to the event type templates display section of FIG. 9, according to implementations of the present disclosure. The user interface portion 1200 displays event templates that are automatically generated from the event data retrieved in accordance with at least the selected index and source type (additional filters may include any received search string, see FIG. 11). As discussed above, the event templates are generated by performance of operations including determining clusters of events according to how lexically similar the events are.

As noted above, in some implementations, a pipelined search query may be executed to determine the clusters, where the pipelined search query includes a clustering command that breaks down the events into terms and computes the vector between events. A similarity threshold may be adjusted to alter how discriminating the clustering command is as to which events are grouped together. In such implementations, the result of the cluster command may append two new fields to each event, which correspond to a cluster count and a cluster label. The cluster count value is the number of events that are part of the cluster, or the cluster size. Each event in the cluster is assigned the cluster label value of the cluster it belongs to. For example, if the search returns 10 clusters, then the clusters are labeled from 1 to 10.

In certain implementations, the clustering command implements machine learning techniques to determine how lexically similar the events are.

In some implementations, clustering may be performed using a pipelined command language, e.g., SPLUNK® SPL, in a one-pass, online manner, which means that clustering may begin as data is being ingested and noted in a log for each event. After ingestion, a cluster command may cluster all events by the clustering noted in each event log.

As discussed above with reference to Tables 1-3, once the events have been placed into clusters, each cluster is then analyzed in order to determine an event template for the cluster. In some examples, the text of the events within a cluster is parsed and consistently repeating terms (static terms) and consistently differing terms (wildcards) are identified. Following the identification of the static terms and the wildcards, generating an event template that includes the static terms and a wildcard character or term (e.g., *) in place of each wildcard. Further, a determination is made as to a field to which a wildcard corresponds, and the wildcard character is replaced with the field name. See Tables 1-3.

Still referring to FIG. 12, the user interface portion 1200 includes a graphical visualization (e.g., a table) having a first column 1202 corresponding to a cluster count and a second column 1204 corresponding to an event template. Thus, the column 1204 provides a visual of the event templates generated including the wildcards replaced with corresponding field names and the column 1202 provides a count of the number of events that correspond to the event template, which may be the cluster count.

FIG. 13 is an example user interface portion corresponding to the field information display section of FIG. 9, according to implementations of the present disclosure. The user interface portion 1300 includes an "interesting" fields display visualization 1310 and a "rare" values display portion 1320. In some examples, the interesting fields display visualization 1310 is a bar graph with each bar representing a visual measure of the mutual information provided by a particular field, where the term mutual information is known to intuitively refer to the amount of information that one variable (field) provides about another. Thus, the field having the highest mutual information score indicates that field provides the greatest information about other fields as compared to the information provided by other fields. Additionally, the term "interesting" is used herein to refer to a mutual information score for the field; thus, for example, a higher mutual information score corresponds to a more interesting field.

In some implementations, the mutual information score is determined for each field through performance of operations including the use of a known calculation for computing mutual information (see Equation (1)) as discussed above.

Additionally, in some implementations, the "rare" values display portion 1320 may be a graphical visualization (e.g., a table) listing having two columns: a first column 1322 providing a rare value of a particular field; and a second column 1324 providing an event that includes the rare value in the particular field. The particular for which rare values are to be determined may be, for example, selected in the interesting fields display visualization 1310 or, when no field is selected, the field having the highest mutual information score. As shown in FIG. 13, the bar 1312 corresponding to the field "dest_port" has been selected and, as a result, the rare values shown in the rare values display portion 1320 correspond to dest_port field values.

In one implementation, rare values are determined by parsing the events for field—field value pairings and maintaining a count of each. Thus, rare values may be determined to be the field values of the field—field value pairings having a count below a particular threshold. In other embodiments, rare values may be determined to be the field values of the field—field value pairings having a count in the within a lowest percentage grouping (e.g., all field—field value pairings having a count in the bottom 10% of all counts may be determined to have a rare field value).

FIG. 14 is an example user interface portion corresponding to the related fields display section of FIG. 9, according to implementations of the present disclosure. The user interface portion 1400 includes a related field groupings display visualization 1410 and a field value comparison portion 1420. The related field groupings display visualization 1410 may be a graphical visualization (e.g., a table) that provides a listing of field grouping (column 1414) and a mutual information score determined for the field grouping (column 1412). In some implementations, the determination of the mutual information score for a field grouping corresponds to the methodology of determining a mutual information score for a particular individual field discussed above.

The field value comparison portion 1420 provides a graphical visualization (e.g., a table) that may include a plurality of columns (e.g., three) including: a first column 1422 displaying a count of a field value—field value pairing in the retrieved event data; a second column 1424 representing a value of a first field; and a third column 1426 representing a value of a second field. The fields selected for the comparison of their values may be a result of selection of a field grouping listed in the related field groupings display visualization 1410 (e.g., field grouping 1416 is shown as being selected) and/or selection of two fields via other UI elements (not shown). In some instances, when a field grouping of three or more fields is selected, the related field groupings display visualization 1410 is configured to explicitly provide UI elements for selection of fields within the selected field grouping. For example, if the first field grouping listed in the related field groupings display visualization 1410 was selected, a user may be prompted to select two of the fields for the value comparison. Thus, in some examples, each of the field groupings listed in column 1414 may be selectable (e.g., configured to receive user input). As shown, the field grouping 1416 has been selected in FIG. 14.

FIG. 15 is an example user interface portion corresponding to the generated search queries display section of FIG. 9, according to implementations of the present disclosure. The user interface portion 1500 includes a graphical visualization (e.g., a table) that provides a listing of automatically generated search query statements that have been tailored according to previous user interactions with the user interface. The table includes a plurality of columns including: a first column 1502 indicating a category of search query statement; a second column 1504 providing a description for the search query statement (e.g., indicating a purpose for executing such); a third column 1506 providing the search query statement; and a fourth column 1508 including selectable text enabling a user to execute the corresponding search query statement. As noted above, each of the plurality of search query statement is configured to perform a specific task for the user, with the task being provided in the second column 1504.

FIG. 15 illustrates how the search query statements are tailored in accordance with previous user input. Referring to illustrative search query statement 1512, three terms are highlighted as being tailored from prior user input. In other words, the tailoring is the importing of terms or characters extracted from prior user interaction such as direct user input (e.g., a search string) or a result of user input (e.g., generation of rare values). The term highlighted terms of the search query statement 1512 include a user specified index (botsv3) 1514, user specified source type (Company:asa) 1516, and an event states count (by dest_port) 1518.

In certain implementations, the above-disclosure includes (i) a computer-implemented method, (ii) a computing device including a processor and a non-transitory computer-readable medium having stored thereon instructions that, when executed by the processor, cause the processor to perform operations, and (iii) a non-transitory computer-readable medium having stored thereon instructions that, when executed by one or more processors, cause the one or more processor to perform operations. Further in certain detailed implementations, the operations of the method and those performed through execution of a processor include: obtaining a plurality of events, generating an event template representing the plurality of events, wherein the generating includes operations of: determining a set of static terms and a set of wildcards within the plurality of events, determining event fields that correspond to each of the set of wildcards, and populating the event template with the set of static terms and the event fields, wherein an ordering of the static terms and the event fields corresponds to an order of terms of the plurality of events; and causing display of the event template on a user interface rendered on a display screen of a network device.

In some implementations, the operations further comprise obtaining event data including at least the plurality of events, and determining a cluster assignment for each event of the event data, wherein each event of the plurality of events is assigned to a first cluster of events. In some examples, determining the cluster assignment for each event of the event data includes processing the event data with a trained machine learning model configured to assign each event to any of one or more clusters of events, wherein the one or more clusters of events includes the first cluster of events. In some implementations, determining the cluster assignment for each event of the event data is based on how lexically similar each event of the event data is to other events of the event data.

In yet other implementations, each event of the plurality of events is a discrete portion of machine data that is associated with a timestamp and is comprised of an ordered set of terms and characters. In some examples, each static term of the set of static terms is a term or a character that repeats consistently across the plurality of events in a particular location within the ordered set of terms and characters. Additionally, in some examples, each wildcard of the set of wildcards is a term that repeats consistently across the plurality of events in a particular location within the ordered set of terms and characters.

In other implementations, the above-disclosure includes (i) a computer-implemented method, (ii) a computing device including a processor and a non-transitory computer-readable medium having stored thereon instructions that, when executed by the processor, cause the processor to perform operations, and (iii) a non-transitory computer-readable medium having stored thereon instructions that, when executed by one or more processors, cause the one or more processor to perform operations. Further in certain detailed implementations, the operations of the method and those performed through execution of a processor include: obtaining event data including a plurality of events, determining a set of fields present in events comprising the plurality of events, determining a mutual information score for fields comprising the set of fields, causing display of a user interface that illustrates at least a portion of the mutual information score for the fields, receiving user input through the user interface indicating selection of a first field of the set of fields, and importing the selected first field into a predetermined search query template thereby generating a tailored search query.

Some implementations further comprise executing the tailored search query thereby generating search query results. Other implementations further comprise parsing the plurality of events and maintaining a count for each value of the selected first field, designating a subset of the values of the selected first field as rare values, and causing display of at least a first event including a first rare value.

Some examples further include determining a mutual information score for a plurality of field groupings, wherein each field includes at least two fields, and causing display of at least a first field grouping and a corresponding mutual information score. Other examples comprise obtaining a count of each value-value pairing for two fields, and causing display of at least a first value-value pairing for a first field and a second value and a corresponding count. In some implementations, the event data is retrieved from an index specified by user input received by the user interface. In additional examples, the event data is filtered to include events derived from a source type specified by user input received by the user interface.

Entities of various types, such as companies, educational institutions, medical facilities, governmental departments, and private individuals, among other examples, operate computing environments for various purposes. Computing environments, which can also be referred to as information technology environments, can include inter-networked, physical hardware devices, the software executing on the hardware devices, and the users of the hardware and software. As an example, an entity such as a school can operate a Local Area Network (LAN) that includes desktop computers, laptop computers, smart phones, and tablets connected to a physical and wireless network, where users correspond to teachers and students. In this example, the physical devices may be in buildings or a campus that is controlled by the school. As another example, an entity such as a business can operate a Wide Area Network (WAN) that includes physical devices in multiple geographic locations where the offices of the business are located. In this example, the different offices can be inter-networked using a combination of public networks such as the Internet and private networks. As another example, an entity can operate a data center at a centralized location, where computing resources (such as compute, memory, and/or networking resources) are kept and maintained, and whose resources are accessible over a network to users who may be in different geographical locations. In this example, users associated with the entity that operates the data center can access the computing resources in the data center over public and/or private networks that may not be operated and controlled by the same entity. Alternatively, or additionally, the operator of the data center may provide the computing resources to users associated with other entities, for example on a subscription basis. Such a data center operator may be referred to as a cloud services provider, and the services provided by such an entity may be described by one or more service models, such as to Software-as-a Service (SaaS) model, Infrastructure-as-a-Service (IaaS) model, or Platform-as-a-Service (PaaS), among others. In these examples, users may expect resources and/or services to be available on demand and without direct active management by the user, a resource delivery model often referred to as cloud computing.

Entities that operate computing environments need information about their computing environments. For example, an entity may need to know the operating status of the various computing resources in the entity's computing environment, so that the entity can administer the environment, including performing configuration and maintenance, performing repairs or replacements, provisioning additional resources, removing unused resources, or addressing issues that may arise during operation of the computing environment, among other examples. As another example, an entity can use information about a computing environment to identify and remediate security issues that may endanger the data, users, and/or equipment in the computing environment. As another example, an entity may be operating a computing environment for some purpose (e.g., to run an online store, to operate a bank, to manage a municipal railway, etc.) and may want information about the computing environment that can aid the entity in understanding whether the computing environment is operating efficiently and for its intended purpose.

Collection and analysis of the data from a computing environment can be performed by a data intake and query system such as is described herein. A data intake and query system can ingest and store data obtained from the components in a computing environment, and can enable an entity to search, analyze, and visualize the data. Through these and other capabilities, the data intake and query system can enable an entity to use the data for administration of the computing environment, to detect security issues, to understand how the computing environment is performing or being used, and/or to perform other analytics.

Figure 16:
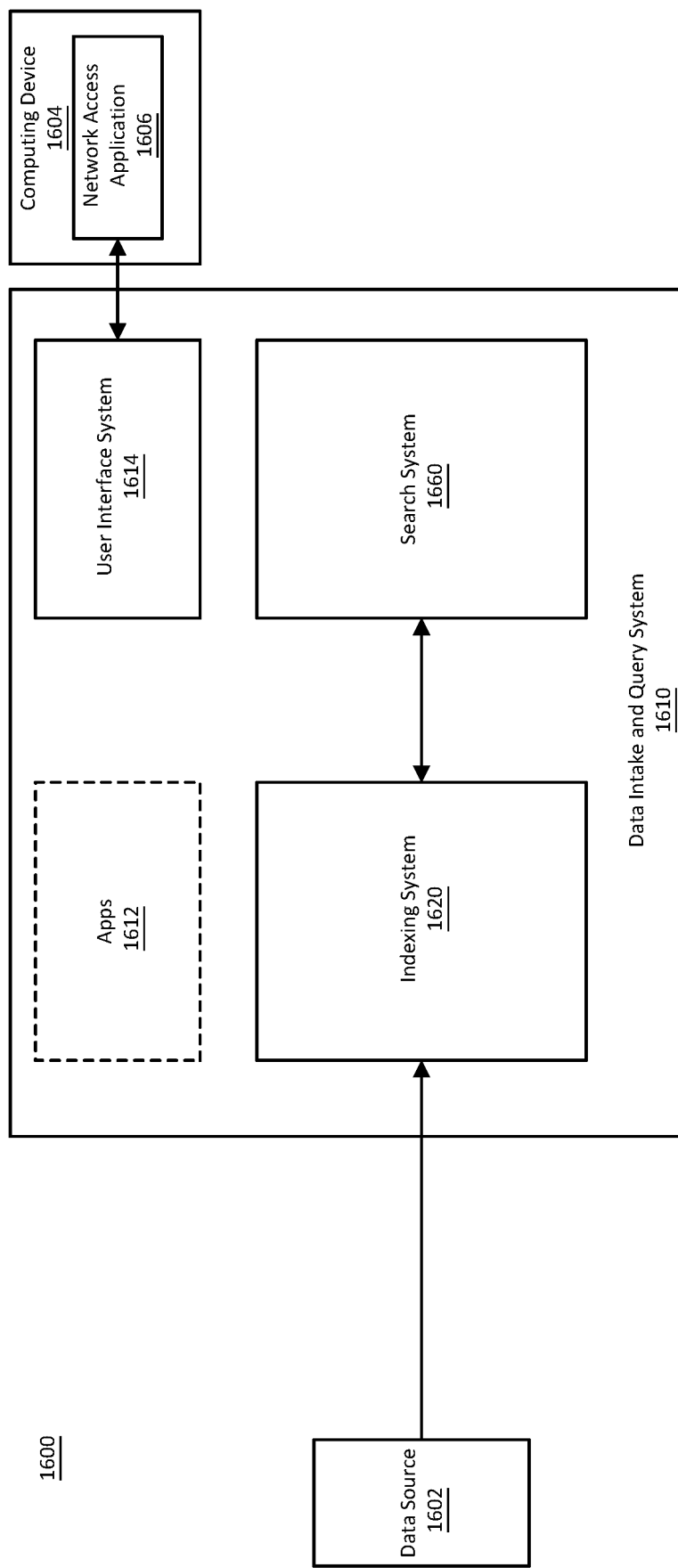
FIG. 16 is a block diagram illustrating an example computing environment that includes a data intake and query system.

FIG. 16 is a block diagram illustrating an example computing environment 1600 that includes a data intake and query system 1610. The data intake and query system 1610 obtains data from a data source 1602 in the computing environment 1600, and ingests the data using an indexing system 1620. A search system 1660 of the data intake and query system 1610 enables users to navigate the indexed data. Though drawn with separate boxes in FIG. 16, in some implementations the indexing system 1620 and the search system 1660 can have overlapping components. A computing device 1604, running a network access application 1606, can communicate with the data intake and query system 1610 through a user interface system 1614 of the data intake and query system 1610. Using the computing device 1604, a user can perform various operations with respect to the data intake and query system 1610, such as administration of the data intake and query system 1610, management and generation of "knowledge objects," (user-defined entities for enriching data, such as saved searches, event types, tags, field extractions, lookups, reports, alerts, data models, workflow actions, and fields), initiating of searches, and generation of reports, among other operations. The data intake and query system 1610 can further optionally include apps 1612 that extend the search, analytics, and/or visualization capabilities of the data intake and query system 1610.

The data intake and query system 1610 can be implemented using program code that can be executed using a computing device. A computing device is an electronic device that has a memory for storing program code instructions and a hardware processor for executing the instructions. The computing device can further include other physical components, such as a network interface or components for input and output. The program code for the data intake and query system 1610 can be stored on a non-transitory computer-readable medium, such as a magnetic or optical storage disk or a flash or solid-state memory, from which the program code can be loaded into the memory of the computing device for execution. "Non-transitory" means that the computer-readable medium can retain the program code while not under power, as opposed to volatile or "transitory" memory or media that requires power in order to retain data.

In various examples, the program code for the data intake and query system 1610 can be executed on a single computing device, or execution of the program code can be distributed over multiple computing devices. For example, the program code can include instructions for both indexing and search components (which may be part of the indexing system 1620 and/or the search system 1660, respectively), which can be executed on a computing device that also provides the data source 1602. As another example, the program code can be executed on one computing device, where execution of the program code provides both indexing and search components, while another copy of the program code executes on a second computing device that provides the data source 1602. As another example, the program code can be configured such that, when executed, the program code implements only an indexing component or only a search component. In this example, a first instance of the program code that is executing the indexing component and a second instance of the program code that is executing the search component can be executing on the same computing device or on different computing devices.

The data source 1602 of the computing environment 1600 is a component of a computing device that produces machine data. The component can be a hardware component (e.g., a microprocessor or a network adapter, among other examples) or a software component (e.g., a part of the operating system or an application, among other examples). The component can be a virtual component, such as a virtual machine, a virtual machine monitor (also referred to as a hypervisor), a container, or a container orchestrator, among other examples. Examples of computing devices that can provide the data source 1602 include personal computers (e.g., laptops, desktop computers, etc.), handheld devices (e.g., smart phones, tablet computers, etc.), servers (e.g., network servers, compute servers, storage servers, domain name servers, web servers, etc.), network infrastructure devices (e.g., routers, switches, firewalls, etc.), and "Internet of Things" devices (e.g., vehicles, home appliances, factory equipment, etc.), among other examples. Machine data is electronically generated data that is output by the component of the computing device and reflects activity of the component. Such activity can include, for example, operation status, actions performed, performance metrics, communications with other components, or communications with users, among other examples. The component can produce machine data in an automated fashion (e.g., through the ordinary course of being powered on and/or executing) and/or as a result of user interaction with the computing device (e.g., through the user's use of input/output devices or applications). The machine data can be structured, semi-structured, and/or unstructured. The machine data may be referred to as raw machine data when the data is unaltered from the format in which the data was output by the component of the computing device. Examples of machine data include operating system logs, web server logs, live application logs, network feeds, metrics, change monitoring, message queues, and archive files, among other examples.

As discussed in greater detail below, the indexing system 1620 obtains machine date from the data source 1602 and processes and stores the data. Processing and storing of data may be referred to as "ingestion" of the data. Processing of the data can include parsing the data to identify individual events, where an event is a discrete portion of machine data that can be associated with a timestamp. Processing of the data can further include generating an index of the events, where the index is a data storage structure in which the events are stored. The indexing system 1620 does not require prior knowledge of the structure of incoming data (e.g., the indexing system 1620 does not need to be provided with a schema describing the data). Additionally, the indexing system 1620 retains a copy of the data as it was received by the indexing system 1620 such that the original data is always available for searching (e.g., no data is discarded, though, in some examples, the indexing system 1620 can be configured to do so).

The search system 1660 searches the data stored by the indexing 1620 system. As discussed in greater detail below, the search system 1660 enables users associated with the computing environment 1600 (and possibly also other users) to navigate the data, generate reports, and visualize search results in "dashboards" output using a graphical interface. Using the facilities of the search system 1660, users can obtain insights about the data, such as retrieving events from an index, calculating metrics, searching for specific conditions within a rolling time window, identifying patterns in the data, and predicting future trends, among other examples. To achieve greater efficiency, the search system 1660 can apply map-reduce methods to parallelize searching of large volumes of data. Additionally, because the original data is available, the search system 1660 can apply a schema to the data at search time. This allows different structures to be applied to the same data, or for the structure to be modified if or when the content of the data changes. Application of a schema at search time may be referred to herein as a late-binding schema technique.

The user interface system 1614 provides mechanisms through which users associated with the computing environment 1600 (and possibly others) can interact with the data intake and query system 1610. These interactions can include configuration, administration, and management of the indexing system 1620, initiation and/or scheduling of queries that are to be processed by the search system 1660, receipt or reporting of search results, and/or visualization of search results. The user interface system 1614 can include, for example, facilities to provide a command line interface or a web-based interface.

Users can access the user interface system 1614 using a computing device 1604 that communicates with data intake and query system 1610, possibly over a network. A "user," in the context of the implementations and examples described herein, is a digital entity that is described by a set of information in a computing environment. The set of information can include, for example, a user identifier, a username, a password, a user account, a set of authentication credentials, a token, other data, and/or a combination of the preceding. Using the digital entity that is represented by a user, a person can interact with the computing environment 1600. For example, a person can log in as a particular user and, using the user's digital information, can access the data intake and query system 1610. A user can be associated with one or more people, meaning that one or more people may be able to use the same user's digital information. For example, an administrative user account may be used by multiple people who have been given access to the administrative user account. Alternatively or additionally, a user can be associated with another digital entity, such as a bot (e.g., a software program that can perform autonomous tasks). A user can also be associated with one or more entities. For example, a company can have associated with it a number of users. In this example, the company may control the users' digital information, including assignment of user identifiers, management of security credentials, control of which persons are associated with which users, and so on.

The computing device 1604 can provide a human-machine interface through which a person can have a digital presence in the computing environment 1600 in the form of a user. The computing device 1604 is an electronic device having one or more processors and a memory capable of storing instructions for execution by the one or more processors. The computing device 1604 can further include input/output (I/O) hardware and a network interface. Applications executed by the computing device 1604 can include a network access application 1606, such as a web browser, which can use a network interface of the client computing device 1604 to communicate, over a network, with the user interface system 1614 of the data intake and query system #A110. The user interface system 1614 can use the network access application 1606 to generate user interfaces that enable a user to interact with the data intake and query system #A110. A web browser is one example of a network access application. A shell tool can also be used as a network access application. In some examples, the data intake and query system 1610 is an application executing on the computing device 1606. In such examples, the network access application 1606 can access the user interface system 1614 without going over a network.

The data intake and query system 1610 can optionally include apps 1612. An app of the data intake and query system 1610 is a collection of configurations, knowledge objects (a user-defined entity that enriches the data in the data intake and query system 1610), views, and dashboards that may provide additional functionality, different techniques for searching the data, and/or additional insights into the data. The data intake and query system 1610 can execute multiple applications simultaneously. Example applications include an information technology service intelligence application, which can monitor and analyze the performance and behavior of the computing environment 1600, and an enterprise security application, which can include content and searches to assist security analysts in diagnosing and acting on anomalous or malicious behavior in the computing environment 1600.

Though FIG. 16 illustrates only one data source, in practical implementations, the computing environment 1600 contains many data sources spread across numerous computing devices. The computing devices may be controlled and operated by a single entity. For example, in an "on the premises" or "on-prem" implementation, the computing devices may physically and digitally be controlled by one entity, meaning that the computing devices are in physical locations that are owned and/or operated by the entity and are within a network domain that is controlled by the entity. In an entirely on-prem implementation of the computing environment 1600, the data intake and query system 1610 executes on an on-prem computing device and obtains machine data from on-prem data sources. An on-prem implementation can also be referred to as an "enterprise" network, though the term "on-prem" refers primarily to physical locality of a network and who controls that location while the term "enterprise" may be used to refer to the network of a single entity. As such, an enterprise network could include cloud components.

"Cloud" or "in the cloud" refers to a network model in which an entity operates network resources (e.g., processor capacity, network capacity, storage capacity, etc.), located for example in a data center, and makes those resources available to users and/or other entities over a network. A "private cloud" is a cloud implementation where the entity provides the network resources only to its own users. A "public cloud" is a cloud implementation where an entity operates network resources in order to provide them to users that are not associated with the entity and/or to other entities. In this implementation, the provider entity can, for example, allow a subscriber entity to pay for a subscription that enables users associated with subscriber entity to access a certain amount of the provider entity's cloud resources, possibly for a limited time. A subscriber entity of cloud resources can also be referred to as a tenant of the provider entity. Users associated with the subscriber entity access the cloud resources over a network, which may include the public Internet. In contrast to an on-prem implementation, a subscriber entity does not have physical control of the computing devices that are in the cloud, and has digital access to resources provided by the computing devices only to the extent that such access is enabled by the provider entity.

In some implementations, the computing environment 1600 can include on-prem and cloud-based computing resources, or only cloud-based resources. For example, an entity may have on-prem computing devices and a private cloud. In this example, the entity operates the data intake and query system 1610 and can choose to execute the data intake and query system 1610 on an on-prem computing device or in the cloud. In another example, a provider entity operates the data intake and query system 1610 in a public cloud and provides the functionality of the data intake and query system 1610 as a service, for example under a Software-as-a-Service (SaaS) model, to entities that pay for the user of the service on a subscription basis. In this example, the provider entity can provision a separate tenant (or possibly multiple tenants) in the public cloud network for each subscriber entity, where each tenant executes a separate and distinct instance of the data intake and query system 1610. In some implementations, the entity providing the data intake and query system 1610 is itself subscribing to the cloud services of a cloud service provider. As an example, a first entity provides computing resources under a public cloud service model, a second entity subscribes to the cloud services of the first provider entity and uses the cloud computing resources to operate the data intake and query system 1610, and a third entity can subscribe to the services of the second provider entity in order to use the functionality of the data intake and query system 1610. In this example, the data sources are associated with the third entity, users accessing the data intake and query system 1610 are associated with the third entity, and the analytics and insights provided by the data intake and query system 1610 are for purposes of the third entity's operations.

Figure 17:
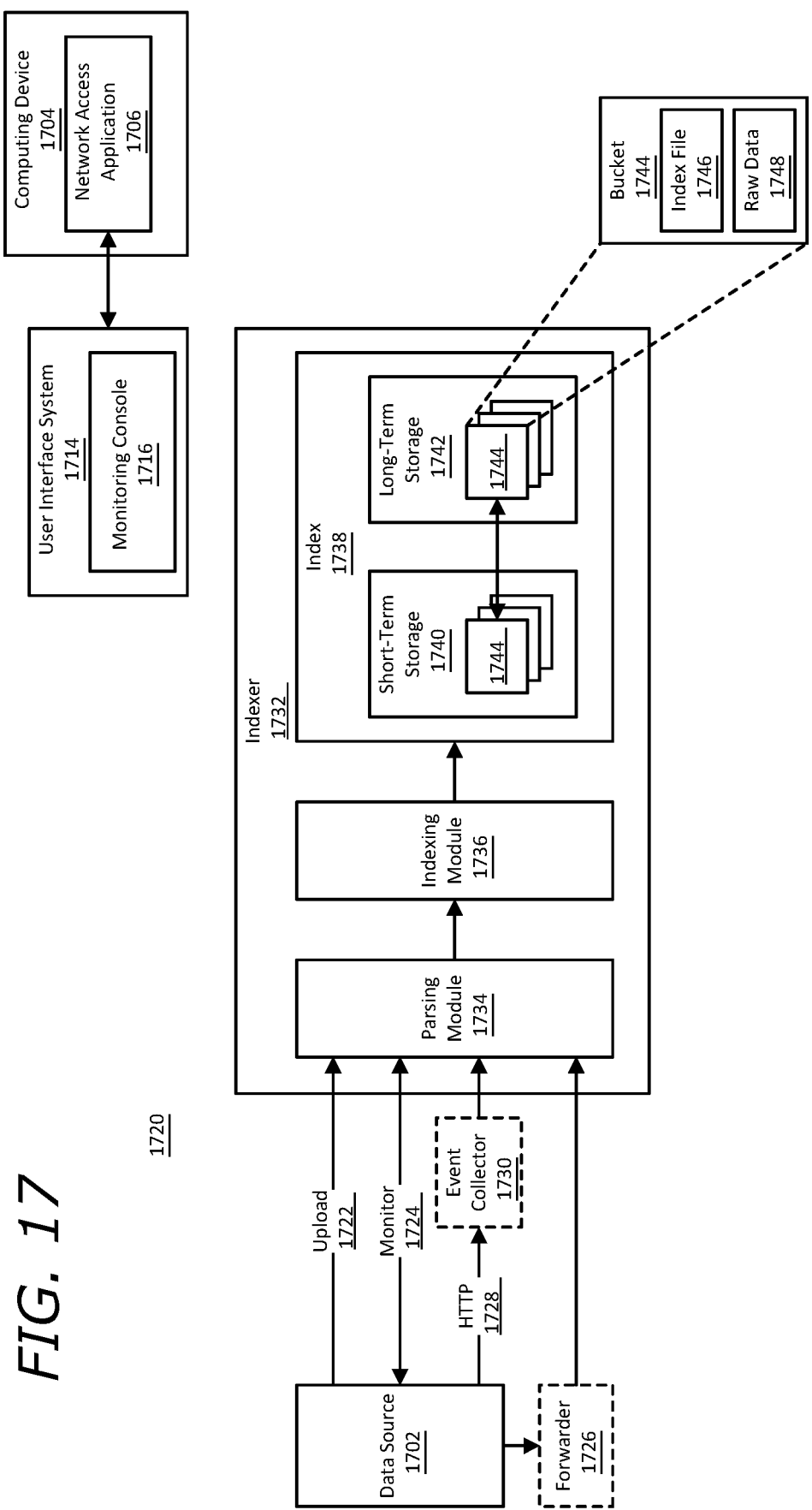
FIG. 17 is a block diagram illustrating in greater detail an example of an indexing system of a data intake and query system, such as the data intake and query system of FIG. 16.

FIG. 17 is a block diagram illustrating in greater detail an example of an indexing system 1720 of a data intake and query system, such as the data intake and query system 1610 of FIG. 16. The indexing system 1720 of FIG. 17 uses various methods to obtain machine data from a data source 1702 and stores the data in an index 1738 of an indexer 1732. As discussed previously, a data source is a hardware, software, physical, and/or virtual component of a computing device that produces machine data in an automated fashion and/or as a result of user interaction. Examples of data sources include files and directories; network event logs; operating system logs, operational data, and performance monitoring data; metrics; first-in, first-out queues; scripted inputs; and modular inputs, among others. The indexing system 1720 enables the data intake and query system to obtain the machine data produced by the data source 1702 and to store the data for searching and retrieval.

Users can administer the operations of the indexing system 1720 using a computing device 1704 that can access the indexing system 1720 through a user interface system 1714 of the data intake and query system. For example, the computing device 1704 can be executing a network access application 1706, such as a web browser or a terminal, through which a user can access a monitoring console 1716 provided by the user interface system 1714. The monitoring console 1716 can enable operations such as: identifying the data source 1702 for data ingestion; configuring the indexer 1732 to index the data from the data source 1732; configuring a data ingestion method; configuring, deploying, and managing clusters of indexers; and viewing the topology and performance of a deployment of the data intake and query system, among other operations. The operations performed by the indexing system 1720 may be referred to as "index time" operations, which are distinct from "search time" operations that are discussed further below.

The indexer 1732, which may be referred to herein as a data indexing component, coordinates and performs most of the index time operations. The indexer 1732 can be implemented using program code that can be executed on a computing device. The program code for the indexer 1732 can be stored on a non-transitory computer-readable medium (e.g. a magnetic, optical, or solid state storage disk, a flash memory, or another type of non-transitory storage media), and from this medium can be loaded or copied to the memory of the computing device. One or more hardware processors of the computing device can read the program code from the memory and execute the program code in order to implement the operations of the indexer 1732. In some implementations, the indexer 1732 executes on the computing device 1704 through which a user can access the indexing system 1720. In some implementations, the indexer 1732 executes on a different computing device than the illustrated computing device 1704.

The indexer 1732 may be executing on the computing device that also provides the data source 1702 or may be executing on a different computing device. In implementations wherein the indexer 1732 is on the same computing device as the data source 1702, the data produced by the data source 1702 may be referred to as "local data." In other implementations the data source 1702 is a component of a first computing device and the indexer 1732 executes on a second computing device that is different from the first computing device. In these implementations, the data produced by the data source 1702 may be referred to as "remote data." In some implementations, the first computing device is "on-prem" and in some implementations the first computing device is "in the cloud." In some implementations, the indexer 1732 executes on a computing device in the cloud and the operations of the indexer 1732 are provided as a service to entities that subscribe to the services provided by the data intake and query system.

For a given data produced by the data source 1702, the indexing system 1720 can be configured to use one of several methods to ingest the data into the indexer 1732. These methods include upload 1722, monitor 1724, using a forwarder 1726, or using HyperText Transfer Protocol (HTTP 1728) and an event collector 1730. These and other methods for data ingestion may be referred to as "getting data in" (GDI) methods.

Using the upload 1722 method, a user can specify a file for uploading into the indexer 1732. For example, the monitoring console 1716 can include commands or an interface through which the user can specify where the file is located (e.g., on which computing device and/or in which directory of a file system) and the name of the file. The file may be located at the data source 1702 or maybe on the computing device where the indexer 1732 is executing. Once uploading is initiated, the indexer 1732 processes the file, as discussed further below. Uploading is a manual process and occurs when instigated by a user. For automated data ingestion, the other ingestion methods are used.

The monitor 1724 method enables the indexing system 1702 to monitor the data source 1702 and continuously or periodically obtain data produced by the data source 1702 for ingestion by the indexer 1732. For example, using the monitoring console 1716, a user can specify a file or directory for monitoring. In this example, the indexing system 1702 can execute a monitoring process that detects whenever the file or directory is modified and causes the file or directory contents to be sent to the indexer 1732. As another example, a user can specify a network port for monitoring. In this example, a monitoring process can capture data received at or transmitting from the network port and cause the data to be sent to the indexer 1732. In various examples, monitoring can also be configured for data sources such as operating system event logs, performance data generated by an operating system, operating system registries, operating system directory services, and other data sources.

Monitoring is available when the data source 1702 is local to the indexer 1732 (e.g., the data source 1702 is on the computing device where the indexer 1732 is executing). Other data ingestion methods, including forwarding and the event collector 1730, can be used for either local or remote data sources.

A forwarder 1726, which may be referred to herein as a data forwarding component, is a software process that sends data from the data source 1702 to the indexer 1732. The forwarder 1726 can be implemented using program code that can be executed on the computer device that provides the data source 1702. A user launches the program code for the forwarder 1726 on the computing device that provides the data source 1702. The user can further configure the forwarder 1726, for example to specify a receiver for the data being forwarded (e.g., one or more indexers, another forwarder, and/or another recipient system), to enable or disable data forwarding, and to specify a file, directory, network events, operating system data, or other data to forward, among other operations.

The forwarder 1726 can provide various capabilities. For example, the forwarder 1726 can send the data unprocessed or can perform minimal processing on the data before sending the data to the indexer 1732. Minimal processing can include, for example, adding metadata tags to the data to identify a source, source type, and/or host, among other information, dividing the data into blocks, and/or applying a timestamp to the data.. In some implementations, the forwarder 1726 can break the data into individual events (event generation is discussed further below) and send the events to a receiver. Other operations that the forwarder 1726 may be configured to perform include buffering data, compressing data, and using secure protocols for sending the data, for example.

Forwarders can be configured in various topologies. For example, multiple forwarders can send data to the same indexer. As another example, a forwarder can be configured to filter and/or route events to specific receivers (e.g., different indexers), and/or discard events. As another example, a forwarder can be configured to send data to another forwarder, or to a receiver that is not an indexer or a forwarder (such as, for example, a log aggregator).

The event collector 1730 provides an alternate method for obtaining data from the data source 1702. The event collector 1730 enables data and application events to be sent to the indexer 1732 using HTTP 1728. The event collector 1730 can be implemented using program code that can be executing on a computing device. The program code may be a component of the data intake and query system or can be a standalone component that can be executed independently of the data intake and query system and operates in cooperation with the data intake and query system.

To use the event collector 1730, a user can, for example using the monitoring console 1716 or a similar interface provided by the user interface system 1714, enable the event collector 1730 and configure an authentication token. In this context, an authentication token is a piece of digital data generated by a computing device, such as a server, that contains information to identify a particular entity, such as a user or a computing device, to the server. The token will contain identification information for the entity (e.g., an alphanumeric string that is unique to each token) and a code that authenticates the entity with the server. The token can be used, for example, by the data source 1702 as an alternative method to using a username and password for authentication.

To send data to the event collector 1730, the data source 1702 is supplied with a token and can then send HTTP 1728 requests to the event collector 1730. To send HTTP 1728 requests, the data source 1702 can be configured to use an HTTP client and/or to use logging libraries such as those supplied by Java, JavaScript, and .NET libraries. An HTTP client enables the data source 1702 to send data to the event collector 1730 by supplying the data, and a Uniform Resource Identifier (URI) for the event collector 1730 to the HTTP client. The HTTP client then handles establishing a connection with the event collector 1730, transmitting a request containing the data, closing the connection, and receiving an acknowledgment if the event collector 1730 sends one. Logging libraries enable HTTP 1728 requests to the event collector 1730 to be generated directly by the data source. For example, an application can include or link a logging library, and through functionality provided by the logging library manage establishing a connection with the event collector 1730, transmitting a request, and receiving an acknowledgement.

An HTTP 1728 request to the event collector 1730 can contain a token, a channel identifier, event metadata, and/or event data. The token authenticates the request with the event collector 1730. The channel identifier, if available in the indexing system 1720, enables the event collector 1730 to segregate and keep separate data from different data sources. The event metadata can include one or more key-value pairs that describe the data source 1702 or the event data included in the request. For example, the event metadata can include key-value pairs specifying a timestamp, a hostname, a source, a source type, or an index where the event data should be indexed. The event data can be a structured data object, such as a JavaScript Object Notation (JSON) object, or raw text. The structured data object can include both event data and event metadata. Additionally, one request can include event data for one or more events.

In some implementations, the event collector 1730 extracts events from HTTP 1728 requests and sends the events to the indexer 1732. The event collector 1730 can further be configured to send events to one or more indexers. Extracting the events can include associating any metadata in a request with the event or events included in the request. In these implementations, event generation by the indexer 1732 (discussed further below) is bypassed, and the indexer 1732 moves the events directly to indexing. In some implementations, the event collector 1730 extracts event data from a request and outputs the event data to the indexer 1732, and the indexer generates events from the event data. In some implementations, the event collector 1730 sends an acknowledgement message to the data source 1702 to indicate that the event collector 1730 has received a particular request form the data source 1702, and/or to indicate to the data source 1702 that events in the request have been added to an index.

The indexer 1732 ingests incoming data and transforms the data into searchable knowledge in the form of events. In the data intake and query system, an event is a single piece of data that represents activity of the component represented in FIG. 17 by the data source 1702. An event can be, for example, a single record in a log file that records a single action performed by the component (e.g., a user login, a disk read, transmission of a network packet, etc.). An event includes one or more fields that together describe the action captured by the event, where a field is a key-value pair (also referred to as a name-value pair). In some cases, an event includes both the key and the value, and in some cases the event includes only the value and the key can be inferred or assumed.

Transformation of data into events can include event generation and event indexing. Event generation includes identifying each discrete piece of data that represents one event and associating each event with a timestamp and possibly other information (which may be referred to herein as metadata). Event indexing includes storing of each event in the data structure of an index. As an example, the indexer 1732 can include a parsing module 1734 and an indexing module 1736 for generating and storing the events. The parsing module 1734 and indexing module 1736 can be modular and pipelined, such that one component can be operating on a first set of data while the second component is simultaneously operating on a second sent of data. Additionally, the indexer 1732 may at any time have multiple instances of the parsing module 1734 and indexing module 1736, with each set of instances configured to simultaneously operate on data from the same data source or from different data sources. The parsing module 1734 and indexing module 1736 are illustrated in FIG. 17 to facilitate discussion, with the understanding that implementations with other components are possible to achieve the same functionality.

The parsing module 1734 determines information about incoming event data, where the information can be used to identify events within the event data. For example, the parsing module 1734 can associate a source type with the event data. A source type identifies the data source 1702 and describes a possible data structure of event data produced by the data source 1702. For example, the source type can indicate which fields to expect in events generated at the data source 1702 and the keys for the values in the fields, and possibly other information such as sizes of fields, an order of the fields, a field separator, and so on. The source type of the data source 1702 can be specified when the data source 1702 is configured as a source of event data. Alternatively, the parsing module 1734 can determine the source type from the event data, for example from an event field in the event data or using machine learning techniques applied to the event data.

Other information that the parsing module 1734 can determine includes timestamps. In some cases, an event includes a timestamp as a field, and the timestamp indicates a point in time when the action represented by the event occurred or was recorded by the data source 1702 as event data. In these cases, the parsing module 1734 may be able to determine from the source type associated with the event data that the timestamps can be extracted from the events themselves. In some cases, an event does not include a timestamp and the parsing module 1734 determines a timestamp for the event, for example from a name associated with the event data from the data source 1702 (e.g., a file name when the event data is in the form of a file) or a time associated with the event data (e.g., a file modification time). As another example, when the parsing module 1734 is not able to determine a timestamp from the event data, the parsing module 1734 may use the time at which it is indexing the event data. As another example, the parsing module 1734 can use a user-configured rule to determine the timestamps to associate with events.

The parsing module 1734 can further determine event boundaries. In some cases, a single line (e.g., a sequence of characters ending with a line termination) in event data represents one event while in other cases, a single line represents multiple events. In yet other cases, one event may span multiple lines within the event data. The parsing module 1734 may be able to determine event boundaries from the source type associated with the event data, for example from a data structure indicated by the source type. In some implementations, a user can configure rules the parsing module 1734 can use to identify event boundaries.

The parsing module 1734 can further extract data from events and possibly also perform transformations on the events. For example, the parsing module 1734 can extract a set of fields (key-value pairs) for each event, such as a host or hostname, source or source name, and/or source type. The parsing module 1734 may extract certain fields by default or based on a user configuration. Alternatively or additionally, the parsing module 1734 may add fields to events, such as a source type or a user-configured field. As another example of a transformation, the parsing module 1734 can anonymize fields in events to mask sensitive information, such as social security numbers or account numbers. Anonymizing fields can include changing or replacing values of specific fields. The parsing component 1734 can further perform user-configured transformations.

The parsing module 1734 outputs the results of processing incoming event data to the indexing module 1736, which performs event segmentation and builds index data structures.

Event segmentation identifies searchable segments, which may alternatively be referred to as searchable terms or keywords, which can be used by the search system of the data intake and query system to search the event data. A searchable segment may be a part of a field in an event or an entire field. The indexer 1732 can be configured to identify searchable segments that are parts of fields, searchable segments that are entire fields, or both. The parsing module 1734 organizes the searchable segments into a lexicon or dictionary for the event data, with the lexicon including each searchable segment (e.g., the field "src=10.10.1.1") and a reference to the location of each occurrence of the searchable segment within the event data (e.g., the location within the event data of each occurrence of "src=10.10.1.1"). As discussed further below, the search system can use the lexicon, which is stored in an index file 1746, to find event data that matches a search query. In some implementations, segmentation can alternatively be performed by the forwarder 1726. Segmentation can also be disabled, in which case the indexer 1732 will not build a lexicon for the event data. When segmentation is disabled, the search system searches the event data directly.

Building index data structures generates the index 1738. The index 1738 is a storage data structure on a storage device (e.g., a disk drive or other physical device for storing digital data). The storage device may be a component of the computing device on which the indexer 1732 is operating (referred to herein as local storage) or may be a component of a different computing device (referred to herein as remote storage) that the indexer 1738 has access to over a network. The indexer 1732 can manage more than one index and can manage indexes of different types. For example, the indexer 1732 can manage event indexes, which impose minimal structure on stored data and can accommodate any type of data. As another example, the indexer 1732 can manage metrics indexes, which use a highly structured format to handle the higher volume and lower latency demands associated with metrics data.

The indexing module 1736 organizes files in the index 1738 in directories referred to as buckets. The files in a bucket 1744 can include raw data files, index files, and possibly also other metadata files. As used herein, "raw data" means data as when the data was produced by the data source 1702, without alteration to the format or content. As noted previously, the parsing component 1734 may add fields to event data and/or perform transformations on fields in the event data. Event data that has been altered in this way is referred to herein as enriched data. A raw data file 1748 can include enriched data, in addition to or instead of raw data. The raw data file 1748 may be compressed to reduce disk usage. An index file 1746, which may also be referred to herein as a "time-series index" or tsidx file, contains metadata that the indexer 1732 can use to search a corresponding raw data file 1748. As noted above, the metadata in the index file 1746 includes a lexicon of the event data, which associates each unique keyword in the event data with a reference to the location of event data within the raw data file 1748. The keyword data in the index file 1746 may also be referred to as an inverted index. In various implementations, the data intake and query system can use index files for other purposes, such as to store data summarizations that can be used to accelerate searches.

A bucket 1744 includes event data for a particular range of time. The indexing module 1736 arranges buckets in the index 1738 according to the age of the buckets, such that buckets for more recent ranges of time are stored in short-term storage 1740 and buckets for less recent ranges of time are stored in long-term storage 1742. Short-term storage 1740 may be faster to access while long-term storage 1742 may be slower to access. Buckets may be moves from short-term storage 1740 to long-term storage 1742 according to a configurable data retention policy, which can indicate at what point in time a bucket is old enough to be moved.

A bucket's location in short-term storage 1740 or long-term storage 1742 can also be indicated by the bucket's status. As an example, a bucket's status can be "hot," "warm," "cold," "frozen," or "thawed." In this example, hot bucket is one to which the indexer 1732 is writing data and the bucket becomes a warm bucket when the index 1732 stops writing data to it. In this example, both hot and warm buckets reside in short-term storage 1740. Continuing this example, when a warm bucket is moved to long-term storage 1742, the bucket becomes a cold bucket. A cold bucket can become a frozen bucket after a period of time, at which point the bucket may be deleted or archived. An archived bucket cannot be searched. When an archived bucket is retrieved for searching, the bucket becomes thawed and can then be searched.

The indexing system 1720 can include more than one indexer, where a group of indexers is referred to as an index cluster. The indexers in an index cluster may also be referred to as peer nodes. In an index cluster, the indexers are configured to replicate each other's data by copying buckets from one indexer to another. The number of copies of a bucket can be configured (e.g., three copies of each buckets must exist within the cluster), and indexers to which buckets are copied may be selected to optimize distribution of data across the cluster.

A user can view the performance of the indexing system 1720 through the monitoring console 1716 provided by the user interface system 1714. Using the monitoring console 1716, the user can configure and monitor an index cluster, and see information such as disk usage by an index, volume usage by an indexer, index and volume size over time, data age, statistics for bucket types, and bucket settings, among other information.

Figure 18:
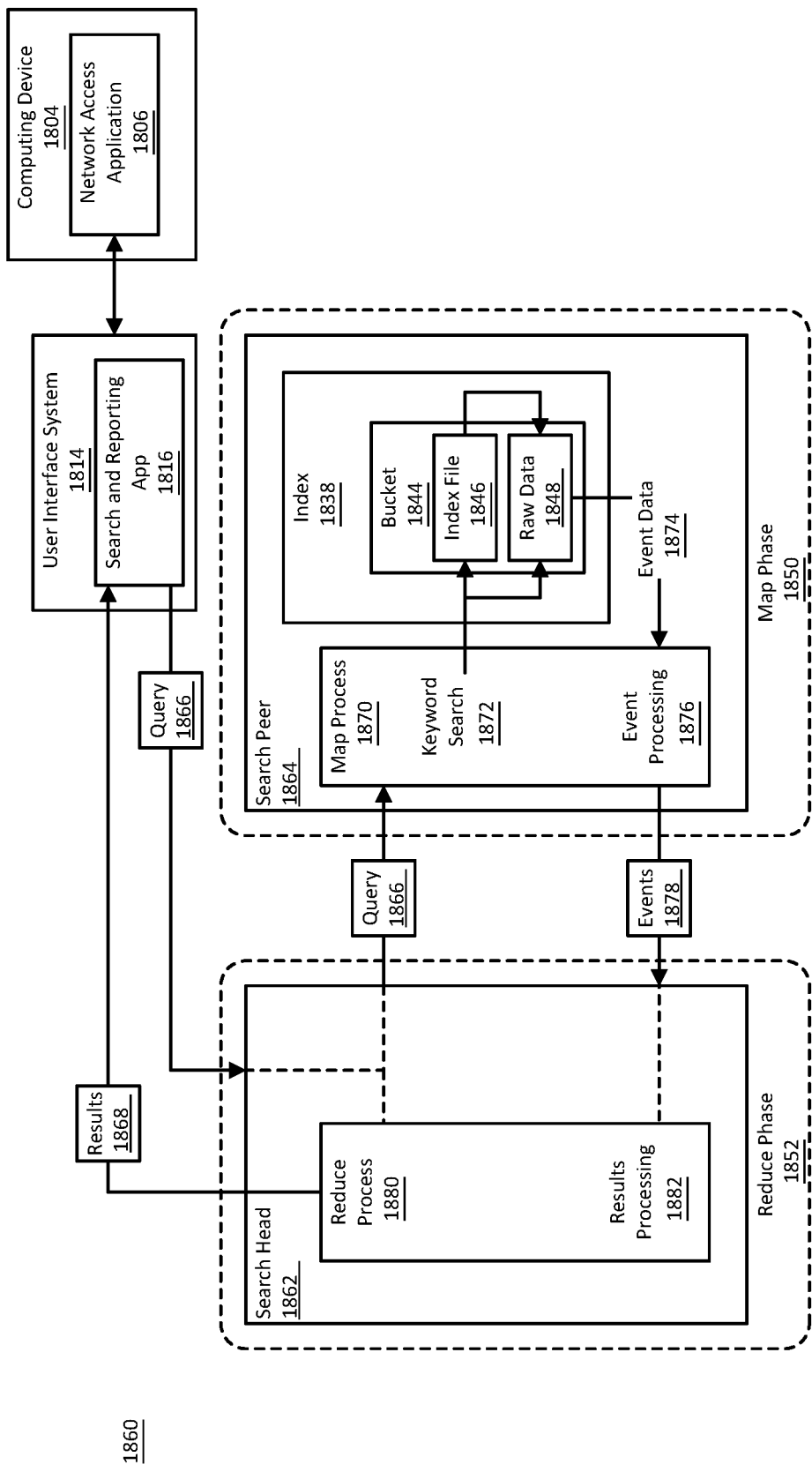
FIG. 18 is a block diagram illustrating in greater detail an example of the search system of a data intake and query system, such as the data intake and query system of FIG. 16.

FIG. 18 is a block diagram illustrating in greater detail an example of the search system 1860 of a data intake and query system, such as the data intake and query system 1610 of FIG. 16. The search system 1860 of FIG. 18 issues a query 1866 to a search head 1862, which sends the query 1866 to a search peer 1864. Using a map process 1870, the search peer 1864 searches the appropriate index 1838 for events identified by the query 1866 and sends events 1878 so identified back to the search head 1862. Using a reduce process 1882, the search head 1862 processes the events 1878 and produces results 1868 to respond to the query 1866. The results 1868 can provide useful insights about the data stored in the index 1838. These insights can aid in the administration of information technology systems, in security analysis of information technology systems, and/or in analysis of the development environment provided by information technology systems.

The query 1866 that initiates a search is produced by a search and reporting app 1816 that is available through the user interface system 1814 of the data intake and query system. Using a network access application 1806 executing on a computing device 1804, a user can input the query 1866 into a search field provided by the search and reporting app 1816. Alternatively or additionally, the search and reporting app 1816 can include pre-configured queries or stored queries that can be activated by the user. In some cases, the search and reporting app 1816 initiates the query 1866 when the user enters the query 1866. In these cases, the query 1866 maybe referred to as an "ad-hoc" query. In some cases, the search and reporting app 1816 initiates the query 1866 based on a schedule. For example, the search and reporting app 1816 can be configured to execute the query 1866 once per hour, once per day, at a specific time, on a specific date, or at some other time that can be specified by a date, time, and/or frequency. These types of queries maybe referred to as scheduled queries.

The query 1866 is specified using a search processing language. The search processing language includes commands or search terms that the search peer 1864 will use to identify events to return in the search results 1868. The search processing language can further include commands for filtering events, extracting more information from events, evaluating fields in events, aggregating events, calculating statistics over events, organizing the results, and/or generating charts, graphs, or other visualizations, among other examples. Some search commands may have functions and arguments associated with them, which can, for example, specify how the commands operate on results and which fields to act upon. The search processing language may further include constructs that enable the query 1866 to include sequential commands, where a subsequent command may operate on the results of a prior command. As an example, sequential commands may be separated in the query 1866 by a vertical line ("|" or "pipe") symbol.

In addition to one or more search commands, the query 1866 includes a time indicator. The time indicator limits searching to events that have timestamps described by the indicator. For example, the time indicator can indicate a specific point in time (e.g., 10:00:00 am today), in which case only events that have the point in time for their timestamp will be searched. As another example, the time indicator can indicate a range of time (e.g., the last 24 hours), in which case only events whose timestamps fall within the range of time will be searched. The time indicator can alternatively indicate all of time, in which case all events will be searched.

Processing of the search query 1866 occurs in two broad phases: a map phase 1850 and a reduce phase 1852. The map phase 1850 takes place across one or more search peers. In the map phase 1850, the search peers locate event data that matches the search terms in the search query 1866 and sorts the event data into field-value pairs. When the map phase 1850 is complete, the search peers send events that they have found to one or more search heads for the reduce phase 1852. During the reduce phase 1852, the search heads process the events through commands in the search query 1866 and aggregate the events to produce the final search results 1868.

A search head, such as the search head 1862 illustrated in FIG. 18, is a component of the search system 1860 that manages searches. The search head 1862, which may also be referred to herein as a search management component, can be implemented using program code that can be executed on a computing device. The program code for the search head 1862 can be stored on a non-transitory computer-readable medium and from this medium can be loaded or copied to the memory of a computing device. One or more hardware processors of the computing device can read the program code from the memory and execute the program code in order to implement the operations of the search head 1862.

Upon receiving the search query 1866, the search head 1862 directs the query 1866 to one or more search peers, such as the search peer 1864 illustrated in FIG. 18. "Search peer" is an alternate name for "indexer" and a search peer may be largely similar to the indexer described previously. The search peer 1864 may be referred to as a "peer node" when the search peer 1864 is part of an indexer cluster. The search peer 1864, which may also be referred to as a search execution component, can be implemented using program code that can be executed on a computing device. In some implementations, one set of program code implements both the search head 1862 and the search peer 1864 such that the search head 1862 and the search peer 1864 form one component. In some implementations, the search head 1862 is an independent piece of code that performs searching and no indexing functionality. In these implementations, the search head 1862 may be referred to as a dedicated search head.

The search head 1862 may consider multiple criteria when determining whether to send the query 1866 to the particular search peer 1864. For example, the search system 1860 may be configured to include multiple search peers that each have duplicative copies of at least some of the event data and are implanted using different hardware resources q. In this example, the sending the search query 1866 to more than one search peer allows the search system 1860 to distribute the search workload across different hardware resources. As another example, search system 1860 may include different search peers for different purposes (e.g., one has an index storing a first type of data or from a first data source while a second has an index storing a second type of data or from a second data source). In this example, the search query 1866 may specify which indexes to search, and the search head 1862 will send the query 1866 to the search peers that have those indexes.

To identify events 1878 to send back to the search head 1862, the search peer 1864 performs a map process 1870 to obtain event data 1874 from the index 1838 that is maintained by the search peer 1864. During a first phase of the map process 1870, the search peer 1864 identifies buckets that have events that are described by the time indicator in the search query 1866. As noted above, a bucket contains events whose timestamps fall within a particular range of time. For each bucket 1844 whose events can be described by the time indicator, during a second phase of the map process 1870, the search peer 1864 performs a keyword search 1874 using search terms specified in the search query #A66. The search terms can be one or more of keywords, phrases, fields, Boolean expressions, and/or comparison expressions that in combination describe events being searched for. When segmentation is enabled at index time, the search peer 1864 performs the keyword search 1872 on the bucket's index file 1846. As noted previously, the index file 1846 includes a lexicon of the searchable terms in the events stored in the bucket's raw data 1848 file. The keyword search 1872 searches the lexicon for searchable terms that correspond to one or more of the search terms in the query 1866. As also noted above, the lexicon incudes, for each searchable term, a reference to each location in the raw data 1848 file where the searchable term can be found. Thus, when the keyword search identifies a searchable term in the index file 1846 that matches a search term in the query 1866, the search peer 1864 can use the location references to extract from the raw data 1848 file the event data 1874 for each event that include the searchable term.

In cases where segmentation was disabled at index time, the search peer 1864 performs the keyword search 1872 directly on the raw data 1848 file. To search the raw data 1848, the search peer 1864 may identify searchable segments in events in a similar manner as when the data was indexed. Thus, depending on how the search peer 1864 is configured, the search peer 1864 may look at event fields and/or parts of event fields to determine whether an event matches the query 1866. Any matching events can be added to the event data #A74 read from the raw data 1848 file. The search peer 1864 can further be configured to enable segmentation at search time, so that searching of the index 1838 causes the search peer 1864 to build a lexicon in the index file 1846.

The event data 1874 obtained from the raw data 1848 file includes the full text of each event found by the keyword search 1872. During a third phase of the map process 1870, the search peer 1864 performs event processing 1876 on the event data 1874, with the steps performed being determined by the configuration of the search peer 1864 and/or commands in the search query 1866. For example, the search peer 1864 can be configured to perform field discovery and field extraction. Field discovery is a process by which the search peer 1864 identifies and extracts key-value pairs from the events in the event data 1874. The search peer 1864 can, for example, be configured to automatically extract the first 100 fields (or another number of fields) in the event data 1874 that can be identified as key-value pairs. As another example, the search peer 1864 can extract any fields explicitly mentioned in the search query 1866. The search peer 1864 can, alternatively or additionally, be configured with particular field extractions to perform.

Other examples of steps that can be performed during event processing 1876 include: field aliasing (assigning an alternate name to a field); addition of fields from lookups (adding fields from an external source to events based on existing field values in the events); associating event types with events; source type renaming (changing the name of the source type associated with particular events); and tagging (adding one or more strings of text, or a "tags" to particular events), among other examples.

The search peer 1864 sends processed events 1878 to the search head 1862, which performs a reduce process 1880. The reduce process 1880 potentially receives events from multiple search peers and performs various results processing 1882 steps on the received events. The results processing 1882 steps can include, for example, aggregating the events received from different search peers into a single set of events, deduplicating and aggregating fields discovered by different search peers, counting the number of events found, and sorting the events by timestamp (e.g., newest first or oldest first), among other examples. Results processing 1882 can further include applying commands from the search query 1866 to the events. The query 1866 can include, for example, commands for evaluating and/or manipulating fields (e.g., to generate new fields from existing fields or parse fields that have more than one value). As another example, the query 1866 can include commands for calculating statistics over the events, such as counts of the occurrences of fields, or sums, averages, ranges, and so on, of field values. As another example, the query 1866 can include commands for generating statistical values for purposes of generating charts of graphs of the events.

The reduce process 1880 outputs the events found by the search query 1866, as well as information about the events. The search head 1862 transmits the events and the information about the events as search results 1868, which are received by the search and reporting app 1816. The search and reporting app 1816 can generate visual interfaces for viewing the search results 1868. The search and reporting app 1816 can, for example, output visual interfaces for the network access application 1806 running on a computing device 1804 to generate.

The visual interfaces can include various visualizations of the search results 1868, such as tables, line or area charts, Chloropleth maps, or single values. The search and reporting app 1816 can organize the visualizations into a dashboard, where the dashboard includes a panel for each visualization. A dashboard can thus include, for example, a panel listing the raw event data for the events in the search results 1868, a panel listing fields extracted at index time and/or found through field discovery along with statistics for those fields, and/or a timeline chart indicating how many events occurred at specific points in time (as indicated by the timestamps associated with each event). In various implementations, the search and reporting app 1816 can provide one or more default dashboards. Alternatively or additionally, the search and reporting app 1816 can include functionality that enables a user to configure custom dashboards.

The search and reporting app 1816 can also enable further investigation into the events in the search results 1816. The process of further investigation may be referred to as drill-down. For example, a visualization in a dashboard can include interactive elements, which, when selected, provide options for finding out more about the data being displayed by the interactive elements. To find out more, an interactive element can, for example, generate a new search that includes some of the data being displayed by the interactive element, and thus may be more focused than the initial search query 1866. As another example, an interactive element can launch a different dashboard whose panels include more detailed information about the data that is displayed by the interactive element. Other examples of actions that can be performed by interactive elements in a dashboard include opening a link, playing an audio or video file, or launching another application, among other examples.

Figure 19:
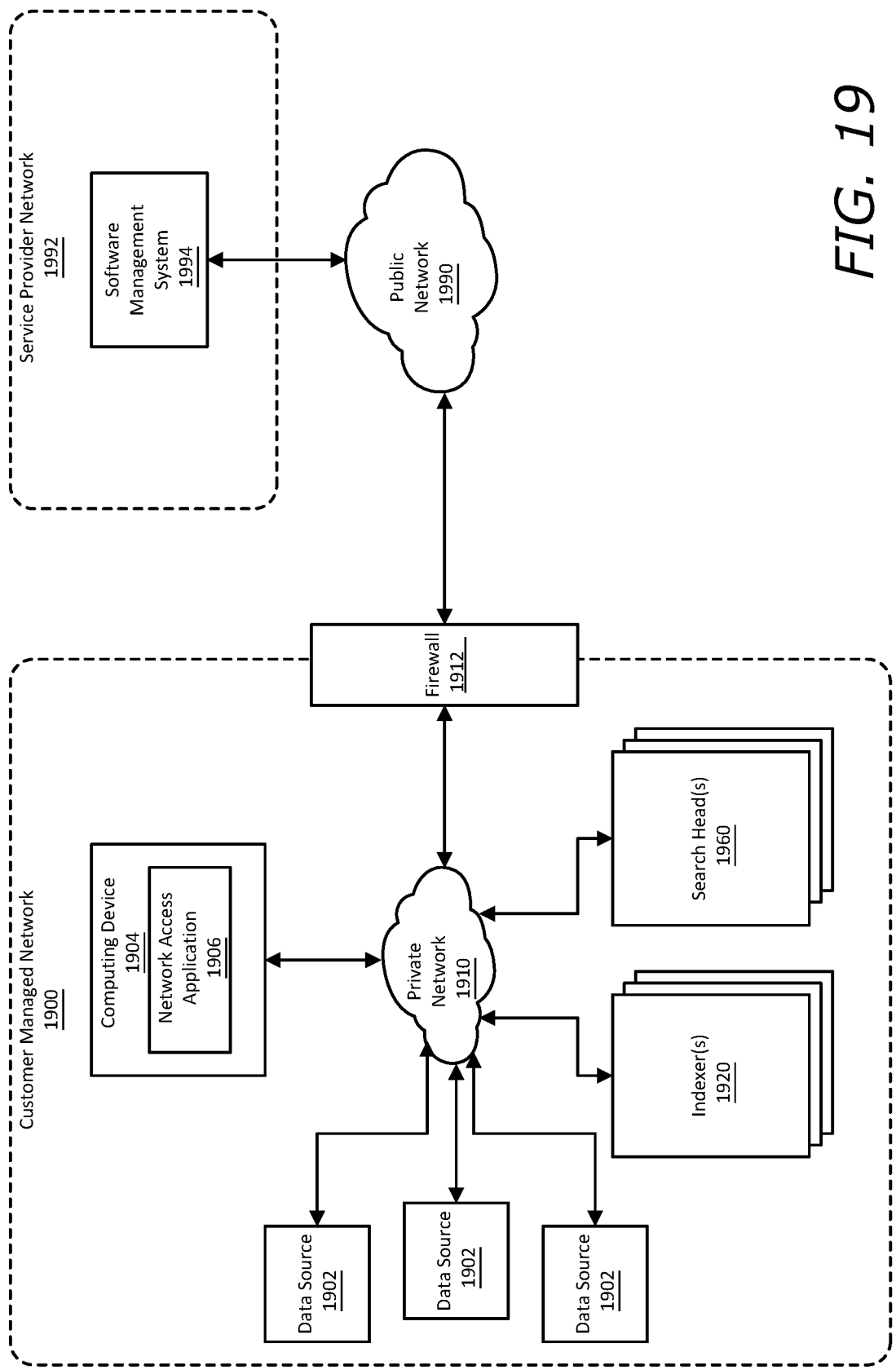
FIG. 19 illustrates an example of a self-managed network that includes a data intake and query system.

FIG. 19 illustrates an example of a self-managed network 1900 that includes a data intake and query system. "Self-managed" in this instance means that the entity that is operating the self-managed network 1900 configures, administers, maintains, and/or operates the data intake and query system using its own compute resources and people. Further, the self-managed network 1900 of this example is part of the entity's on-premise network and comprises a set of compute, memory, and networking resources that are located, for example, within the confines of an entity's data center. These resources can include software and hardware resources. The entity can, for example, be a company or enterprise, a school, government entity, or other entity. Since the self-managed network 1900 is located within the customer's on-prem environment, such as in the entity's data center, the operation and management of the self-managed network 1900, including of the resources in the self-managed network 1900, is under the control of the entity. For example, administrative personnel of the entity have complete access to and control over the configuration, management, and security of the self-managed network 1900 and its resources.

The self-managed network 1900 can execute one or more instances of the data intake and query system. An instance of the data intake and query system may be executed by one or more computing devices that are part of the self-managed network 1900. A data intake and query system instance can comprise an indexing system and a search system, where the indexing system includes one or more indexers 1920 and the search system includes one or more search heads 1960.

As depicted in FIG. 19, the self-managed network 1900 can include one or more data sources 1902. Data received from these data sources may be processed by an instance of the data intake and query system within self-managed network 1900. The data sources 1902 and the data intake and query system instance can be communicatively coupled to each other via a private network 1910.

Users associated with the entity can interact with and avail themselves of the functions performed by a data intake and query system instance using computing devices. As depicted in FIG. 19, a computing device 1904 can execute a network access application 1906 (e.g., a web browser), that can communicate with the data intake and query system instance and with data sources 1902 via the private network 1910. Using the computing device 1904, a user can perform various operations with respect to the data intake and query system, such as management and administration of the data intake and query system, generation of knowledge objects, and other functions. Results generated from processing performed by the data intake and query system instance may be communicated to the computing device 1904 and output to the user via an output system (e.g., a screen) of the computing device 1904.

The self-managed network 1900 can also be connected to other networks that are outside the entity's on-premise environment/network, such as networks outside the entity's data center. Connectivity to these other external networks is controlled and regulated through one or more layers of security provided by the self-managed network 1900. One or more of these security layers can be implemented using firewalls 1912. The firewalls 1912 form a layer of security around the self-managed network 1900 and regulate the transmission of traffic from the self-managed network 1900 to the other networks and from these other networks to the self-managed network 1900.

Networks external to the self-managed network can include various types of networks including public networks 1990, other private networks, and/or cloud networks provided by one or more cloud service providers. An example of a public network 1990 is the Internet. In the example depicted in FIG. 19, the self-managed network 1900 is connected to a service provider network 1992 provided by a cloud service provider via the public network 1990.

In some implementations, resources provided by a cloud service provider may be used to facilitate the configuration and management of resources within the self-managed network 1900. For example, configuration and management of a data intake and query system instance in the self-managed network 1900 may be facilitated by a software management system 1994 operating in the service provider network 1992. There are various ways in which the software management system 1994 can facilitate the configuration and management of a data intake and query system instance within the self-managed network 1900. As one example, the software management system 1994 may facilitate the download of software including software updates for the data intake and query system. In this example, the software management system 1994 may store information indicative of the versions of the various data intake and query system instances present in the self-managed network 1900. When a software patch or upgrade is available for an instance, the software management system 1994 may inform the self-managed network 1900 of the patch or upgrade. This can be done via messages communicated from the software management system 1994 to the self-managed network 1900.

The software management system 1994 may also provide simplified ways for the patches and/or upgrades to be downloaded and applied to the self-managed network 1900. For example, a message communicated from the software management system 1994 to the self-managed network 1900 regarding a software upgrade may include a Uniform Resource Identifier (URI) that can be used by a system administrator of the self-managed network 1900 to download the upgrade to the self-managed network 1900. In this manner, management resources provided by a cloud service provider using the service provider network 1992 and which are located outside the self-managed network 1900 can be used to facilitate the configuration and management of one or more resources within the entity's on-prem environment. In some implementations, the download of the upgrades and patches may be automated, whereby the software management system 1994 is authorized to, upon determining that a patch is applicable to a data intake and query system instance inside the self-managed network 1900, automatically communicate the upgrade or patch to self-managed network 1900 and cause it to be installed within self-managed network 1900.

Various examples and possible implementations have been described above, which recite certain features and/or functions. Although these examples and implementations have been described in language specific to structural features and/or functions, it is understood that the subject matter defined in the appended claims is not necessarily limited to the specific features or functions described above. Rather, the specific features and functions described above are disclosed as examples of implementing the claims, and other equivalent features and acts are intended to be within the scope of the claims. Further, any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Processing of the various components of systems illustrated herein can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Examples have been described with reference to flow chart illustrations and/or block diagrams of methods, apparatus (systems), and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

What is claimed is:

1. A computerized method comprising:
   obtaining event data including a plurality of events;
   determining a set of fields present in events comprising the plurality of events;
   determining a mutual information score for a plurality of fields included within the set of fields, wherein the mutual information score for the plurality of fields identifies a level of diversity between values included in the plurality of fields;
   causing display of a user interface that illustrates at least a portion of the mutual information score for the plurality of fields;
   receiving user input through the user interface indicating selection of a first field of the plurality of fields of the set of fields; and
   importing the selected first field into a predetermined search query template thereby generating a tailored search query.

2. The computerized method of claim 1, further comprising:
   executing the tailored search query thereby generating search query results.

3. The computerized method of claim 1, further comprising:
  parsing the plurality of events and maintaining a count for each value of the selected first field;
  designating a subset of the values of the selected first field as rare values; and
  causing display of at least a first event including a first rare value.

4. The computerized method of claim 1, wherein the determining of the mutual information score for the plurality of fields comprises
  determining the mutual information score for a plurality of field groupings, wherein each field grouping of the plurality of field groupings includes at least two fields; and
  causing display of at least a first field grouping of the plurality of field groupings and a corresponding mutual information score.

5. The computerized method of claim 1, further comprising:
  obtaining a count of each value-value pairing for two fields of the plurality of fields; and
  causing display of at least a first value-value pairing for the first field and a second value and a corresponding count.

6. The computerized method of claim 1, wherein the event data is retrieved from an index specified by user input received by the user interface.

7. The computerized method of claim 1, wherein the event data is filtered to include events derived from a source type specified by user input received by the user interface.

8. A computing device, comprising:
  a processor; and
  a non-transitory computer-readable medium having stored thereon instructions that, when executed by the processor, cause the processor to perform operations including:
  obtaining event data including a plurality of events;
  determining a set of fields present in events comprising the plurality of events;
  determining a mutual information score for a plurality of fields included within the set of fields, wherein the mutual information score for the plurality of fields identifies a level of diversity between values included in the plurality of fields;
  causing display of a user interface that illustrates at least a portion of the mutual information score for the plurality of fields;
  receiving user input though the user interface indicating selection of a first field of the plurality of fields of the set of fields; and
  importing the selected first field into a predetermined search query template thereby generating a tailored search query.

9. The computing device of claim 8, wherein the operations further include:
  executing the tailored search query thereby generating search query results.

10. The computing device of claim 8, wherein the operations further include:
  parsing the plurality of events and maintaining a count for each value of the selected first field;
  designating a subset of the values of the selected first field as rare values; and
  causing display of at least a first event including a first rare value.

11. The computing device of claim 8, wherein the determining of the mutual information score for the plurality of fields further comprises:
  determining the mutual information score for a plurality of field groupings, wherein each field grouping of the plurality of field groupings includes at least two fields; and
  causing display of at least a first field grouping of the plurality of field groupings and a corresponding mutual information score.

12. The computing device of claim 8, wherein the operations further include:
  obtaining a count of each value-value pairing for two fields of the plurality of fields; and
  causing display of at least a first value-value pairing for the first field and a second value and a corresponding count.

13. The computing device of claim 8, wherein the event data is retrieved from an index specified by user input received by the user interface.

14. The computing device of claim 8, wherein the event data is filtered to include events derived from a source type specified by user input received by the user interface.

15. A non-transitory computer-readable medium having stored thereon instructions that, when executed by one or more processors, cause the one or more processor to perform operations comprising:
  obtaining event data including a plurality of events;
  determining a set of fields present in events comprising the plurality of events;
  determining a mutual information score for a plurality of fields included within the set of fields, wherein the mutual information score for the plurality of fields identifies a level of diversity between values included in the plurality of fields;
  causing display of a user interface that illustrates at least a portion of the mutual information score for the plurality of fields;
  receiving user input though the user interface indicating selection of a first field of the plurality of fields of the set of fields; and
  importing the selected first field into a predetermined search query template thereby generating a tailored search query.

16. The non-transitory computer-readable medium of claim 15, wherein the operations further include:
  executing the tailored search query thereby generating search query results.

17. The non-transitory computer-readable medium of claim 15, wherein the operations further include:
  parsing the plurality of events and maintaining a count for each value of the selected first field;
  designating a subset of the values of the selected first field as rare values; and
  causing display of at least a first event including a first rare value.

18. The non-transitory computer-readable medium of claim 15, wherein the determining of the mutual information score for the plurality of fields further comprises:
  determining the mutual information score for a plurality of field groupings, wherein each field grouping of the plurality of field groupings includes at least two fields; and
  causing display of at least a first field grouping of the plurality of field groupings and a corresponding mutual information score.

19. The non-transitory computer-readable medium of claim 15, wherein the operations further include:
- obtaining a count of each value-value pairing for two fields of the plurality of fields; and
- causing display of at least a first value-value pairing for the first field and a second value and a corresponding count.

20. The non-transitory computer-readable medium of claim 15, wherein the event data is retrieved from an index specified by user input received by the user interface, and wherein the event data is filtered to include events derived from a source type specified by user input received by the user interface.

* * * * *